US012592846B2

(12) United States Patent　　(10) Patent No.: US 12,592,846 B2

Fankhauser et al.　　(45) Date of Patent: Mar. 31, 2026

(54) METHOD AND SYSTEM FOR HYBRID ANALOG AND DIGITAL SIGNAL PROCESSING AND ROUTING

(71) Applicant: Evertz Microsystems Ltd., Burlington (CA)

(72) Inventors: Eric Fankhauser, Burlington (CA); Nicholas Joseph Johnston, Allison Park, PA (US)

(73) Assignee: Evertz Microsystems Ltd., Burlington (CA)

( * ) Notice: Subject to any disclaimer, the term of this patent is extended or adjusted under 35 U.S.C. 154(b) by 0 days.

(21) Appl. No.: 18/123,442

(22) Filed: Mar. 20, 2023

(65) Prior Publication Data

US 2023/0300003 A1　　Sep. 21, 2023

Related U.S. Application Data

(60) Provisional application No. 63/321,781, filed on Mar. 21, 2022.

(51) Int. Cl.
　　*H04L 12/64* 　　(2006.01)
(52) U.S. Cl.
　　CPC .................................... *H04L 12/64* (2013.01)
(58) Field of Classification Search
　　CPC ....................................................... H04L 12/64
　　USPC ............................................................ 375/216
　　See application file for complete search history.

(56) References Cited

U.S. PATENT DOCUMENTS

| | | | |
|---|---|---|---|
| 6,388,658 B1 * | 5/2002 | Ahern | ................. G06F 13/4022 |
| | | | 348/E7.084 |
| 7,490,345 B2 | 2/2009 | Rakib et al. | |
| 7,792,228 B2 | 9/2010 | Yoon | |
| 9,337,918 B2 * | 5/2016 | Bell | ........................ H04B 17/40 |
| 10,594,385 B2 | 3/2020 | Buehler et al. | |
| 10,616,637 B2 | 4/2020 | Daleck et al. | |
| 2001/0030989 A1 * | 10/2001 | Arambepola | ......... H04L 7/0004 |
| | | | 375/139 |
| 2003/0063695 A1 | 4/2003 | Lee | |

(Continued)

FOREIGN PATENT DOCUMENTS

| | | |
|---|---|---|
| EP | 2536034 A1 | 12/2012 |
| JP | 2011233962 A | 11/2011 |

OTHER PUBLICATIONS

Combined Search and Examination Report, dated Sep. 19, 2023. United Kingdom Patent Application No. 2303997.7, www.gov.uk/ipo (6 pages).

(Continued)

*Primary Examiner* — Kevin M Burd

(74) *Attorney, Agent, or Firm* — SMART & BIGGAR LP

(57) ABSTRACT

Embodiments here broadly relate to a system which allows for flexibly, and adaptively, accommodating for various analog and digital streams. In one example case, the system can accommodate for the use of both legacy modems as well as newer digital modems. The system may not require the use of complex and expensive, very high data rate and/or very high throughput wideband digital switches in some architectures, as well as potentially eliminating the need for some additional processing equipment found in traditional architectures (i.e., wideband signal processors (WSP), legacy modem data converts (LDMCs), etc.).

12 Claims, 23 Drawing Sheets

(56) References Cited

U.S. PATENT DOCUMENTS

| | | | |
|---|---|---|---|
| 2004/0062392 A1* | 4/2004 | Morton ............. | H04N 21/6118 |
| | | | 348/E7.054 |
| 2006/0052124 A1 | 3/2006 | Pottenger et al. | |
| 2011/0170577 A1 | 7/2011 | Anvari | |
| 2012/0044975 A1* | 2/2012 | Lai ..................... | H04L 27/2637 |
| | | | 375/295 |
| 2012/0286983 A1 | 11/2012 | Pfann et al. | |
| 2016/0371515 A1* | 12/2016 | Jung ....................... | H01Q 3/00 |
| 2017/0070283 A1* | 3/2017 | Floch ................... | H04L 7/0016 |
| 2018/0359718 A1 | 12/2018 | Gupta | |
| 2021/0150328 A1 | 5/2021 | Dasalukunte et al. | |

OTHER PUBLICATIONS

Search and Examination Report, dated Mar. 19, 2025. UK Application No. GB2303997.7, www.gov.uk/ipo., 7 pages.

* cited by examiner

FIG. 4A

METHOD AND SYSTEM FOR HYBRID ANALOG AND DIGITAL SIGNAL PROCESSING AND ROUTING

REFERENCE TO RELATED APPLICATIONS

This application claims the benefit of U.S. Provisional Application No. 63/321,781 filed on Mar. 21, 2022, the complete disclosure of which is incorporate herein by reference.

FIELD

The described embodiments relate to signal routers, and in particular, to methods and systems for hybrid analog and digital signal processing and routing.

BACKGROUND

Routers are often deployed in antenna-based and other communication systems to route signals between the antenna and/or other signal sources, and modems which transmit and receive signals to, and from, various downstream devices and networks. It has been appreciated, however, that existing routing systems may not adequately adapt to the increasing use of digital communication systems, or otherwise, flexibly accommodate for the use of both legacy analog and digital communications in the same communication system.

SUMMARY OF THE VARIOUS EMBODIMENTS

The following introduction is provided to introduce the reader to the more detailed discussion to follow. The introduction is not intended to limit or define any claimed or as yet unclaimed invention. One or more inventions may reside in any combination or sub-combination of the elements or process steps disclosed in any part of this document including its claims and figures.

Embodiments here broadly relate to a system which allows for flexibly, and adaptively, accommodating for various analog and digital streams. In one example case, the system can accommodate for the use of both legacy modems as well as newer digital modems. The system may not require the use of complex and expensive, very high data rate and/or very high throughput wideband digital switches in some architectures, as well as potentially eliminating the need for some additional processing equipment found in traditional architectures (i.e., wideband signal processors (WSP), legacy modem data converts (LDMCs), etc.).

In one broad aspect, there is provided a system comprising a communication subsystem for receiving and transmitting analog signals; one or more downstream digital devices; at least one analog router coupled between the communication subsystem, and the one or more downstream analog and digital devices, wherein the at least one analog router comprises one or more digital conversion subsystems (DCS) which couple to the one or more downstream digital devices to convert between the analog and digital domains.

Other features and advantages of the present application will become apparent from the following detailed description. It should be understood, however, that the detailed description and the specific examples, while indicating embodiments of the application, are given by way of illustration only and the scope of the claims should not be limited by these embodiments, but should be given the broadest interpretation consistent with the description as a whole.

BRIEF DESCRIPTIONS OF THE DRAWINGS

For a better understanding of the embodiments described herein and to show more clearly how they may be carried into effect, reference will now be made, by way of example only, to the accompanying drawings which show at least one exemplary embodiment, and in which:

FIG. 4A is an example signal flow through the system of FIG. 3A, in an example case where a signal is received from an antenna;

Figure 1:
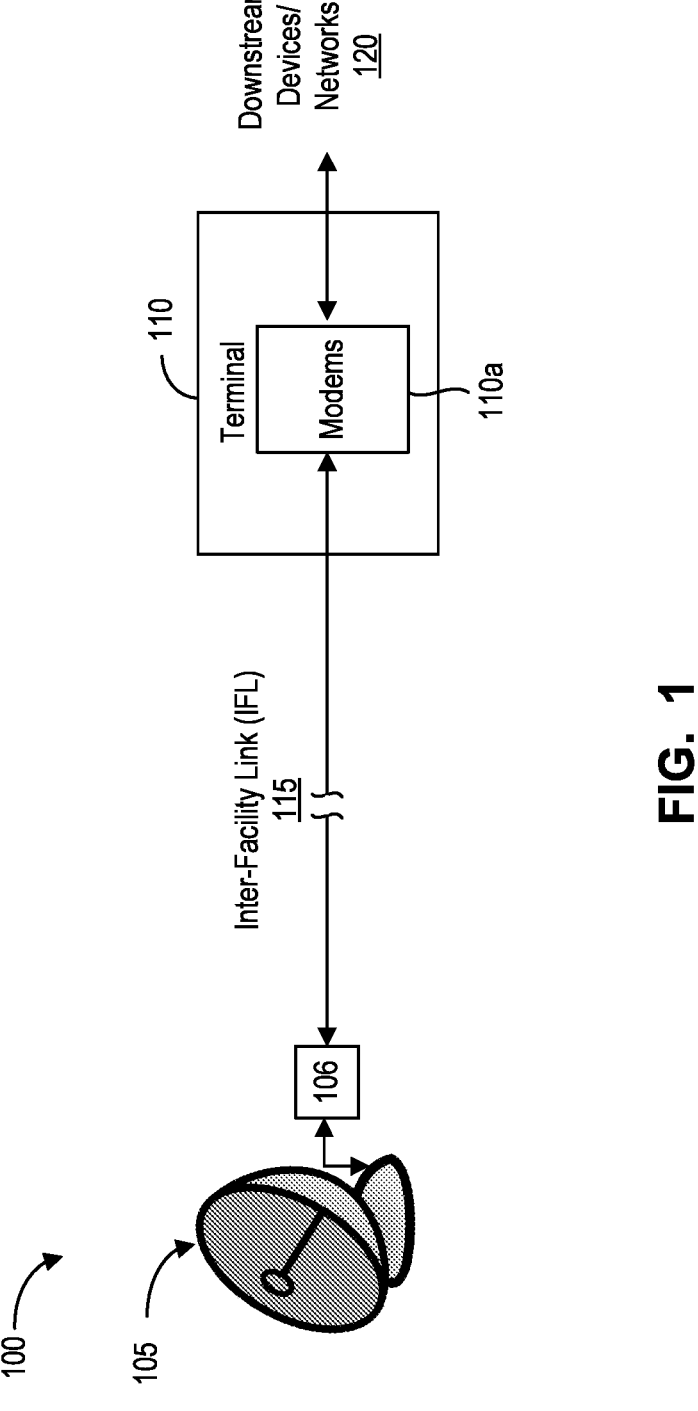
FIG. 1 is an example antenna-based communication system.

Further aspects and features of the example embodiments described herein will appear from the following description taken together with the accompanying drawings.

DESCRIPTION OF VARIOUS EMBODIMENTS

It will be appreciated that numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing the implementation of the various embodiments described herein.

It should be noted that terms of degree such as "substantially", "about" and "approximately" when used herein mean a reasonable amount of deviation of the modified term such that the end result is not significantly changed. These terms of degree should be construed as including a deviation of the modified term if this deviation would not negate the meaning of the term it modifies.

In addition, as used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

The terms "including," "comprising" and variations thereof mean "including but not limited to," unless expressly specified otherwise. A listing of items does not imply that any or all of the items are mutually exclusive, unless expressly specified otherwise. The terms "a," "an" and "the" mean "one or more," unless expressly specified otherwise.

As used herein and in the claims, two or more elements are said to be "coupled", "connected", "attached", or "fastened" where the parts are joined or operate together either directly or indirectly (i.e., through one or more intermediate parts), so long as a link occurs. As used herein and in the claims, two or more elements are said to be "directly coupled", "directly connected", "directly attached", or "directly fastened" where the element are connected in physical contact with each other. None of the terms "coupled", "connected", "attached", and "fastened" distinguish the manner in which two or more elements are joined together.

The terms "an embodiment," "embodiment," "embodiments," "the embodiment," "the embodiments," "one or more embodiments," "some embodiments," and "one embodiment" mean "one or more (but not all) embodiments of the present invention(s)," unless expressly specified otherwise.

The embodiments of the systems and methods described herein may be implemented in hardware or software, or a combination of both. These embodiments may be implemented in computer programs executing on programmable computers, each computer including at least one processor, a data storage system (including volatile memory or nonvolatile memory or other data storage elements or a combination thereof), and at least one communication interface. For example and without limitation, the programmable computers may be a server, network appliance, embedded device, computer expansion module, a personal computer, laptop, personal data assistant, cellular telephone, smartphone device, tablet computer, a wireless device or any other computing device capable of being configured to carry out the methods described herein.

In some embodiments, the communication interface may be a network communication interface. In embodiments in which elements are combined, the communication interface may be a software communication interface, such as those for inter-process communication (IPC). In still other embodiments, there may be a combination of communication interfaces implemented as hardware, software, and combination thereof.

Program code may be applied to input data to perform the functions described herein and to generate output information. The output information is applied to one or more output devices, in known fashion.

Each program may be implemented in a high-level procedural or object oriented programming and/or scripting language, or both, to communicate with a computer system. However, the programs may be implemented in assembly or machine language, if desired. In any case, the language may be a compiled or interpreted language. Each such computer program may be stored on a storage media or a device (e.g. ROM, magnetic disk, optical disc) readable by a general or special purpose programmable computer, for configuring and operating the computer when the storage media or device is read by the computer to perform the procedures described herein. Embodiments of the system may also be considered to be implemented as a non-transitory computer-readable storage medium, configured with a computer program, where the storage medium so configured causes a computer to operate in a specific and predefined manner to perform the functions described herein.

Furthermore, the system, processes and methods of the described embodiments are capable of being distributed in a computer program product comprising a computer readable medium that bears computer usable instructions for one or more processors. The medium may be provided in various forms, including one or more diskettes, compact disks, tapes, chips, wireline transmissions, satellite transmissions, internet transmission or downloadings, magnetic and electronic storage media, digital and analog signals, and the like. The computer useable instructions may also be in various forms, including compiled and non-compiled code.

In the description herein, the term "article" is used to refer to an object that is being manufactured, produced, packaged, transported, and/or distributed etc. As used herein, the term "article" may refer to a product and/or a package containing a product. An "article" may refer to a product that is intended to be received/used by a retailer, distributor and/or end-user and/or the entire package that may be received by a retailer, distributor and/or end-user including external packaging and/or containers and the goods/products contained therein.

Reference is now made to FIG. 1, which shows an example antenna-based communication system 100.

As shown, the system 100 include an antenna 105 for receiving and broadcasting radio frequency (RF) signals. Antenna 105 is coupled to a processing subsystem 106, which as explained herein, may perform frequency conversion as well as low noise amplification and high-power amplification.

The antenna 105 is typically separated from a fixed terminal 110, which houses various baseband processing equipment and modems 110a. To this end, modems 110a may communicate with other downstream devices and networks 120, such that the modems 110a may receive signals therefrom, or transmit signals thereto. In some cases, the antenna 105 is linked to the terminal 110 via an inter-facilities link 115. The IFL 115 can be used to minimize the amount of interference received on transmission.

While system 100 shows only a single antenna 105, it will be appreciated that in other cases, multiple antennas 105 may also be included in the system 100.

Figure 2A:
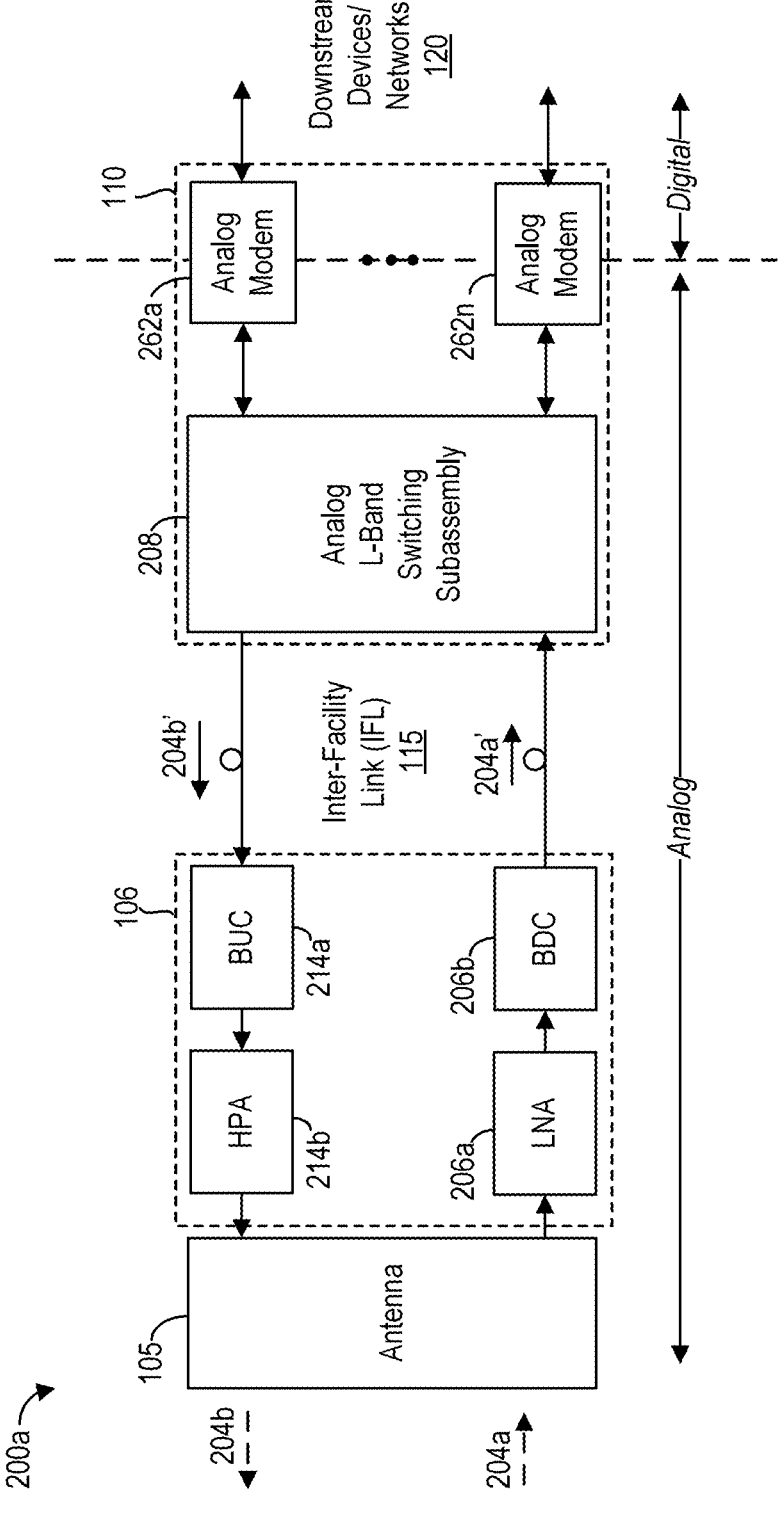
FIG. 2A is a simplified block diagram representative of a conventional, or a traditional analog-based implementation of an antenna-based communication system.

Reference is now made to FIG. 2A, which illustrates a simplified block diagram 200a representative of a conventional, or traditional analog-based implementation of the communication system 100.

As shown, the antenna 105 (i.e., a satellite dish) is provided to receive RF signals 204a, or otherwise broadcast RF signals 204b. The signals 204a, 204b may transport multiple signal channels which are, for example, multiplexed in the time and/or frequency and/or phase domains.

The RF signals 204a, 204b are typically high frequency signals. For example, the signals 204a, 204b can be one of C-band signals (4 to 8 GHZ), X-band signals (8 to 12 GHZ), Ku-Band signals (12 to 18 GHZ), K-band signals (18 to 26.5 GHZ) or Ka-Band signals (26.5 to 40 GHZ). In some cases, the antenna 105 may be a multi-band antenna which can operate over multiple frequency bands (i.e., may transmit or receive over multiple frequency ranges).

In the receiving pathway—a received RF signal 204a is initially pre-processed by the processing subsystem 106. As shown in FIG. 1, processing subsystem 106 is typically mounted behind the antenna 105 or in another outdoor hub. The processing subsystem 106 can include a low noise amplifier (LNA) 206a followed by a block downconverter (BDC) 206b.

The LNA 206a amplifies the low-power RF signal 204a without significantly degrading its signal-to-noise (SNR) ratio. Further, the BDC 206b can down convert the high-frequency RF signal 205a, to a lower frequency analog RF signal 204a'. For example, the BDC 206b may down convert to a lower frequency L-band signal (i.e., 1 to 2 GHZ), which is often referred to as an intermediate frequency (IF) frequency. Lowering the frequency can facilitate passing and processing of the signal through cheaper low-frequency cables and electronic components.

From the BDC 206b, the low frequency RF signal 204a' is transported to an analog switching subassembly 208 (i.e., an analog L-band switching subassembly), via the IFL 115. In this example, the IFL link 115 may be a coaxial or analog fiber connection.

While only a single LNA 206a and BDC 206b are illustrated in FIG. 2A, it will be understood that there may be multiple parallel LNA and BDC connections between the antenna 105 and the switching subassembly 208. For example, in multi-band antennas, a separate LNAs and/or BDCs may be provided for processing signals received in different frequency ranges.

With reference now to the analog switch 208, the analog switch 208 operates to switch the incoming IF signal 204a' to an appropriate modem 262a-262n, based on the desired destination of the signal. The modem 262, in turn, demodulates the signal and converts the signal into the digital domain for transport to other downstream devices and networks 120.

In the reverse case—i.e., the transmission pathway—a modem 262 may receive a digital signal and convert that signal into a low-frequency analog signal 204b' (i.e., an IF signal). The analog signal 204b' is routed by the switching subassembly 208 towards the antenna 105, via the IFL 115.

Analog signal 204b' may be processed by a block-up converter (BUC) 214a and/or a high-power amplifier (HPA) 214b. The BUC 214a transforms the low-frequency signal to a higher-frequency RF signal. For example, this may involve transforming the intermediate frequency (i.e., L-band) signal into a higher transmission frequency (i.e., C-band, X-band, etc.).

While only a single BUC and HPA are shown in FIG. 2A, in other cases, there may again be multiple connections of BUCs and HPAs. For example, a separate set of BUCs and HPAs may be provided for different broadcast frequency ranges. Accordingly, switching subassembly 208 may route the signal 204b' to the appropriate BUC and HPA.

To this end, a significant disadvantages of the system 200a is that it fails to accommodate for the advent of digital modems with digital, e.g., Ethernet, interfaces for digitized RF signals, which operate on a fully digital basis. That is, the system 200a only accommodates legacy modems 262a, which receive or transmit signals in the analog domain. More broadly, system 200a also fails to accommodate for digital backhaul, virtualization and flexibility of processing and routing signals in the analog and/or digital domains.

The system 200a also has various other architectural drawbacks. For example, the IFL 115 is often a coaxial cable or analog fiber connection. In respect of coaxial cables, these cables often introduce substantial insertion loss, noise, lightning strike susceptibility or otherwise have undesirable electromagnetic interference (EMI) and electromagnetic pulse (EMP) characteristics. Further, the analog fiber connections are limited in their dynamic range, and are often limited to distances less than 100 KM.

Figure 2B:
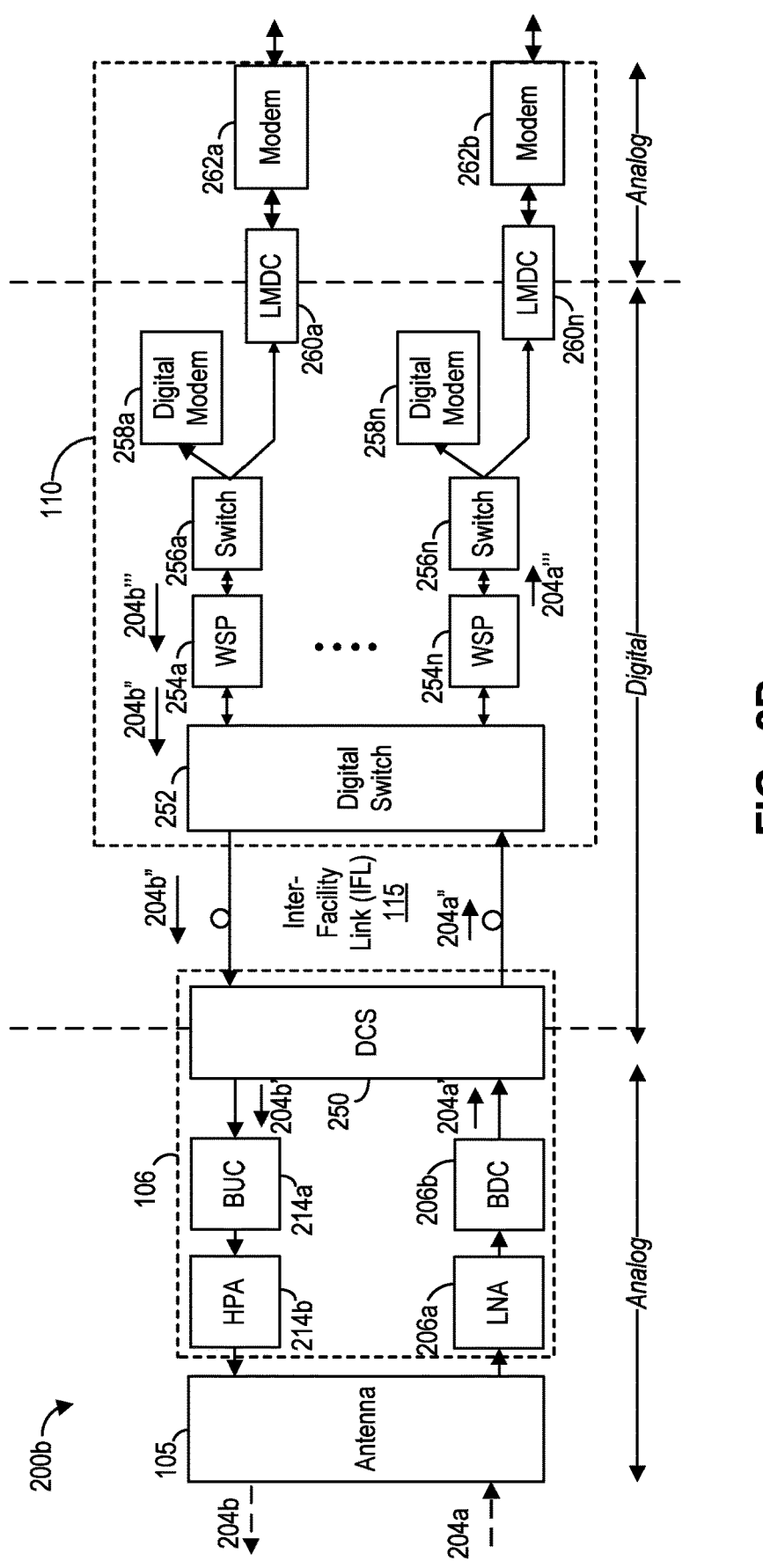
FIG. 2B is a simplified block diagram representative of a digital intermediate frequency (IF) implementation of an antenna-based communication system.

Reference is now made to FIG. 2B, which illustrates a simplified block diagram 200b representative of a digital intermediate frequency (IF) implementation of the communication system 100 of FIG. 1. Architecture 200b, also known as a FAST terminal digital IF architecture, has been proposed as an alternative to mitigate at least some of the drawbacks of system 200a.

As shown, as contrasted to system 200a, the system 200b includes a digital conversion subsystem (DCS) 250 located between the IFL 115 and the processing modules 206, 214. The analog switch subassembly 208 is also now replaced with a digital switch 252.

In more detail, along the receiving pathway—DCS 250 receives the low frequency signals 204a' from the BDC 206b. The DCS 250 comprise a wideband analog-to-digital converter (ADC), which converts the analog signal 204a' into a corresponding wideband digital signal 204a". The wideband digital signal 204a" travels through the IFL 115 and is received by the digital switch 252. In one example, the IFL 115 may comprise a GbE (Gigabit Ethernet) over digital fiber connection (e.g., 10 GbE, 25 GbE, 40 GbE or 100 GbE).

Digital switch 252 receives the wideband digital signal 204a", and proceeds to route the signal to one or more digital modems 258 and/or legacy modems 262. In some cases, the digital switch 252 may comprise a commercial-off-the-shelf (COTS) Ethernet switch.

More particularly, the digital switch 252 may route the wideband digital signal 204a" to one of a number of wideband signal processors (WSP) 254. Each WSP 254 operates to receive the wideband digital signal 204a", and further performs digital signal channelization. The digital signal channelization allows the WSP 254 to select a channel among the plurality of channels carried in the wideband digital signal 204a". In this manner, the WSP 254 reduces the wideband signal 204a" to a narrowband digital signal 204a''' carrying fewer channels and occupying a narrower frequency spectrum. In various cases, each WSP 254 may select the appropriate channels, from wideband signal 204a″, based on the destination of the signal. Other functions performed by the WSP 254 include bandwidth management, packet routing, sampling and propagation.

The narrowband digital signal 204a″—generated by the WSP 254—is then further routed through a second digital switch 256. The switch 256 may be a lower-cost transport ethernet switch for transporting the narrower bandwidth signal 204a‴, i.e., a 1/10 Gbps switching fabric. Switch 256 may route the signal 204a″ to a digital modem (DM) 258, or otherwise to a legacy modem 262 via a legacy modem data converter (LMDC) 260.

In the reverse mode of operation (i.e., signal transmission)—the system 200b operates in an inverse manner. That is, a narrowband digital signal 204b″ is received from a digital or legacy modem 258, 262. In this case, WSP 254 may perform, among other functions, signal aggregation/combining to generate a wideband digital signal 204b‴ comprising multiple digital signal channels. The wideband digital signal 204b‴ is routed by digital switch 252 to the DCS 250.

In the transmission pathway, the DCS 250 may include a wideband digital-to-analog (DAC) converter, which converts the wideband digital signal 204b‴ to a wideband analog signal 204b′. The wideband analog signal 204b′ is then upconverted by the BUC 214a and processed by the HPA 214b to generate an RF signal 204b that is broadcast by the antenna 105.

While only a single DCS is shown in FIG. 2B, there may be in-fact multiple DCSs for processing different frequency ranges of signals being received or transmitted through the antenna 105.

To this end, as contrasted to system 200a, the system 200b accommodates both traditional modems 262 as well as newer digital modems 258. Additionally, the system 200b enables the use of a digital fiber connection for the IFL 115, which avoids issues associated with use of coaxial cables or analog fiber links.

The system 200b, however, still suffers from a number of important drawbacks. For example, the DCS 250 generates wideband, and very high data rate (e.g., 10 Gb/s-100 Gb/s) digital signals, which are passed to the digital switch 252. In turn, this requires a complex, very high throughput and expensive wideband digital switch 252 to accommodate for the many wideband, high data rate signals. Further, system 200b requires additional expensive, high throughput equipment (i.e., WSPs 254) to select the narrowband digital signals from the routed wideband digital signals. This, as well, introduces inefficiencies and additional costs to the system 200b.

Still further, the system 200b operates to convert signals into the digital domain, irrespective of whether the signals are transmitted/received from digital modems or legacy models. That is, the DCS 250 is configured to always perform analog to digital conversion, and/or digital to analog conversion, even where signals are transmitted/received from legacy modems. To accommodate for this, the system therefore requires the additional LMDC 260 hardware to interface the legacy modems 262 with the remaining digital architecture of system 200b. Accordingly, this also introduces an additional layer of system-wide inefficiency and cost.

Figure 3A:
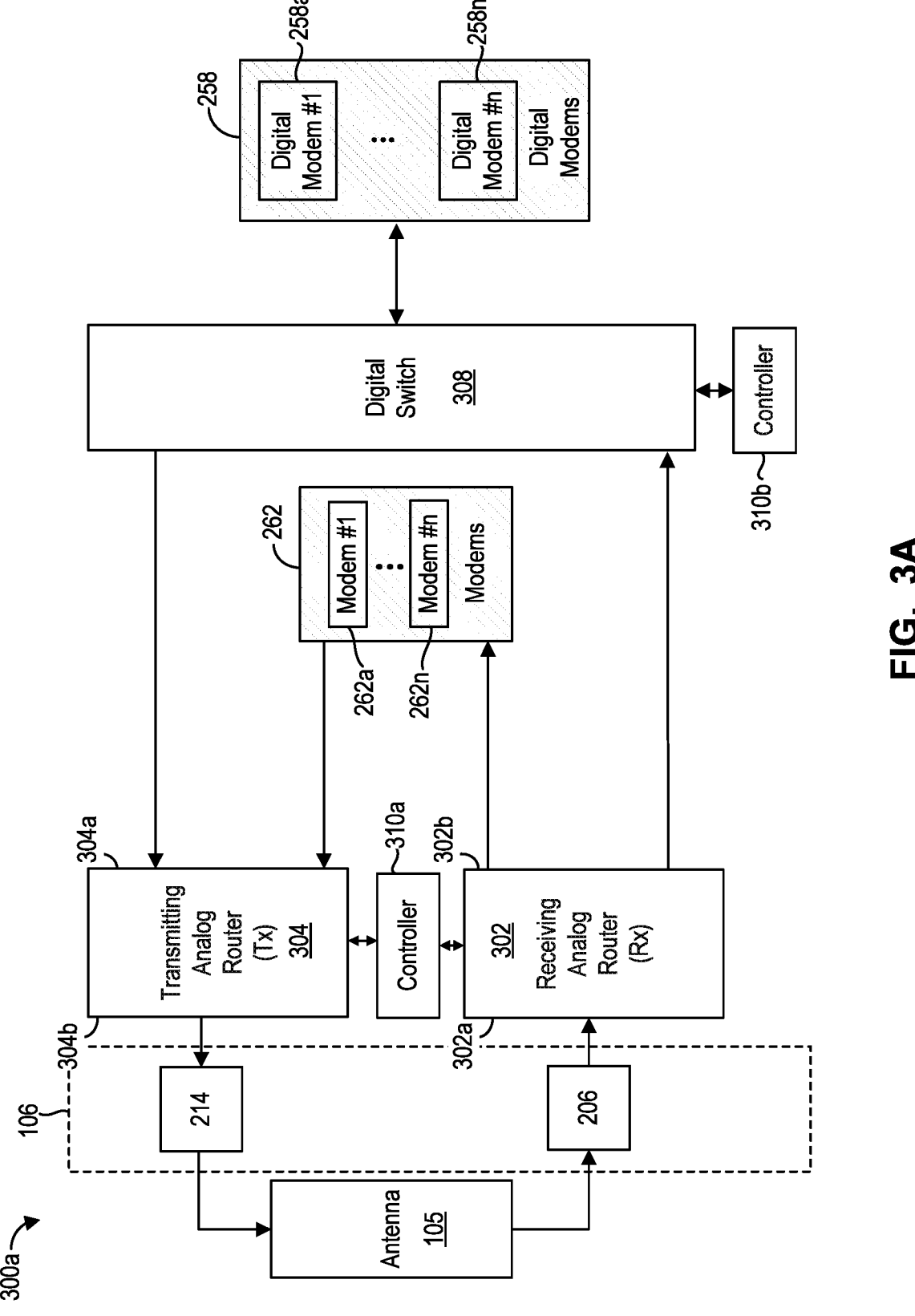
FIG. 3A is a simplified block diagram of an example hybrid analog and digital signal processing and routing system, according to at least one example embodiment.

Reference is now made to FIG. 3A, which shows a simplified block diagram of an example hybrid analog and digital signal processing and routing system 300a, in accordance with the teachings provided herein.

System 300a is believed to overcome at least some of the drawbacks associated with the systems 200a and 200b. For example, as explained, system 300a may flexibly, and adaptively, accommodate for the use of both legacy modems 262 as well as newer digital modems 258. As well, the system 300a may not require the use of complex and expensive, very high data rate and/or very high throughput wideband digital switches in some architectures, as well as potentially eliminating the need for some additional processing equipment in system 200b (i.e., WSPs 254, LMDCs 260, etc).

In more detail, as shown, the system 300a includes a receiving analog router 302 and a transmitting analog router 304. Receiving router 302 includes a signal input side 302a and a signal output side 302b. Signal input side 302a is coupled to the antenna 105, via one or more receiving processing modules 206. Output side 302b is coupled to the analog modems 262 and/or digital switch 308.

Receiving router 302 receives signals from the antenna 105, via the input side 302a. Receiving router 302 may then route these signals to one or more of the legacy modems 262 and/or digital switch 308.

In at least one embodiment, receiving router 302 may convert analog signals to digital signals, prior to passing these signals to the digital switch 308. This may be a unique integrated functionality of the router 302. Router 302 may also, more particularly, convert or tune wideband analog signals into narrower band digital signals. As explained herein, the narrower band digital signals are more easily routed through a lower-cost digital switch 308.

Similarly, transmitting router 304 also includes a signal input side 304a and a signal output side 304b. Input side 304a is coupled to one or more of the analog modems 262 and/or the digital switch 308. Output side 304b is coupled to the antenna 105, via the transmitting processing modules 214.

As provided herein, transmitting router 304 may receive signals from the analog modems 262 and/or digital switch 308, and route these signals to the antenna 105 via one of the transmitting processing modules 214. Similar to the receiving router 302, the transmitting router 304 may also have integrated functionality to convert digital signals, received from digital switch 308, into analog signals for routing.

In at least one example embodiment, the receiving router 302 may be a "fan-out" router. That is, the router 302 may receive a single signal at the input side 302a, and may fan-out multiple copies of that signal to the output side 302b. In this manner, a single signal received from antenna 105 can be routed to multiple legacy modems 262 and/or digital modems 258. Similarly, transmitting router 304 may be a "fan-in router". That is, router 304 can receive multiple signals from multiple upstream sources (i.e., legacy modems 262 and/or digital modems 258) and generate a single composite output signal to transmit to the antenna 105. This may involve, for example, multiplexing/aggregating multiple input signals in the time and/or frequency and/or phase domain.

System 300a also includes the digital switch 308 for routing digital signals. Digital switch 308 is interposed between, on one side, the receiving and transmitting routers 302, 304, and on the other side, and the digital modems 258. Accordingly, digital switch 308 can receive signals from receiving router 302, and route these signals to the relevant digital modem 258. In the reverse case, digital switch 308 can receive signals from the digital modems 258, and may route those signals to the transmitting router 304.

To this end, the digital switch 308 may be configured to route various formats and standards of digital signals, including SDI (Serial Digital Interface), Ethernet or internet protocol (IP) signals. In some cases, the digital switch 308 may comprise a software defined network (SDN) for routing Ethernet and/or IP signals.

In some example embodiments, the digital switch 308 may not be provided in the system 300*a*. In these cases, signals are directly routed to, or received from, the digital modems 258. In other example embodiments, the digital switch 308 may only couple to one of the receiving router 302 and the transmitting router 304 (i.e., rather than to both routers). For example, the digital switch 308 may only perform switching in one of the receiving or transmitting pathways.

One or more controllers 310*a*, 310*b* are also provided in the system 300*a*. Controllers 310 may provide controlling functionality for routers 302, 304 and/or 308. For example, a first controller 310*a* is coupled to, and controls routing in each of the receiving and transmitting routers 302 and 304. In other cases, separate controllers can be provided for independently controlling each of routers 302 and 304. Similarly, a controller 310*b* is provided for controlling routing within the digital switch 308. In some cases, controllers 310*a*, 310*b* may be the same controller.

It will be appreciated that while, for ease of description, FIG. 3A illustrates the routers 302, 304 and controller 310 as being located proximal the antenna 105—the system is not so limited in design. That is, the routers 302, 304 and controller 310 may be located anywhere with respect to the antenna 105. For example, routers 302, 304 may or may not be necessarily connected to the digital switch 308 and modems 262 via an explicit inter-facilities link 115, and may use any type of connection. The same applies to the combined router 380, that is described further on herein in relation to FIG. 3B.

The advantages of the system design 300*a* will now become more apparent in view of the below discussion in respect of the operation of the system when receiving and transmitting signals.

Figure 4A:
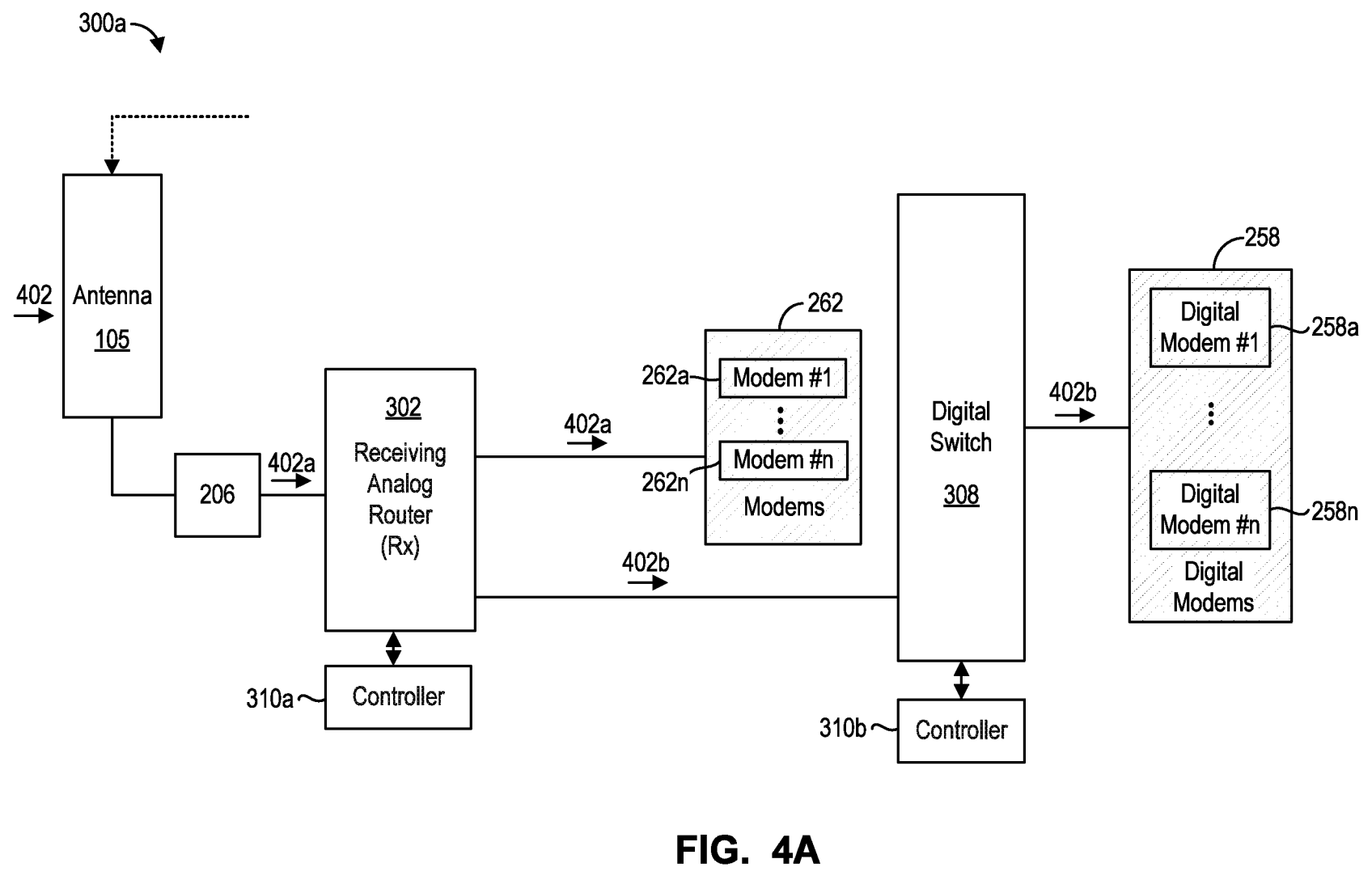

Reference is now made to FIG. 4A, which illustrates an example signal flow through the system 300*a* in a case where a signal is received from the antenna 105.

As shown, an RF signal 402 is received by the antenna 105, and is pre-processed by the receiving processing modules 206 to generate a lower-frequency signal 402*a* (i.e., an IF signal).

Lower frequency signal 402*a* is passed through the analog router 302, which routes the signal 402*a* to one of the legacy modems 262 and/or the digital switch 308. Where the signal is routed to the digital switch 308, the router 302 may have embedded functionality to convert the analog signal into the digital domain. That is, after routing the analog signal 402*a* in the analog domain, the router 302 may convert the signal into a digital signal 402*b*, before passing the signal to the digital switch 308. Digital switch 308 may, in turn, receive the digital signal 402*b*. Digital switch 308 may then further route the digital signal 402*b* to one or more digital modems 258.

Figure 4B:
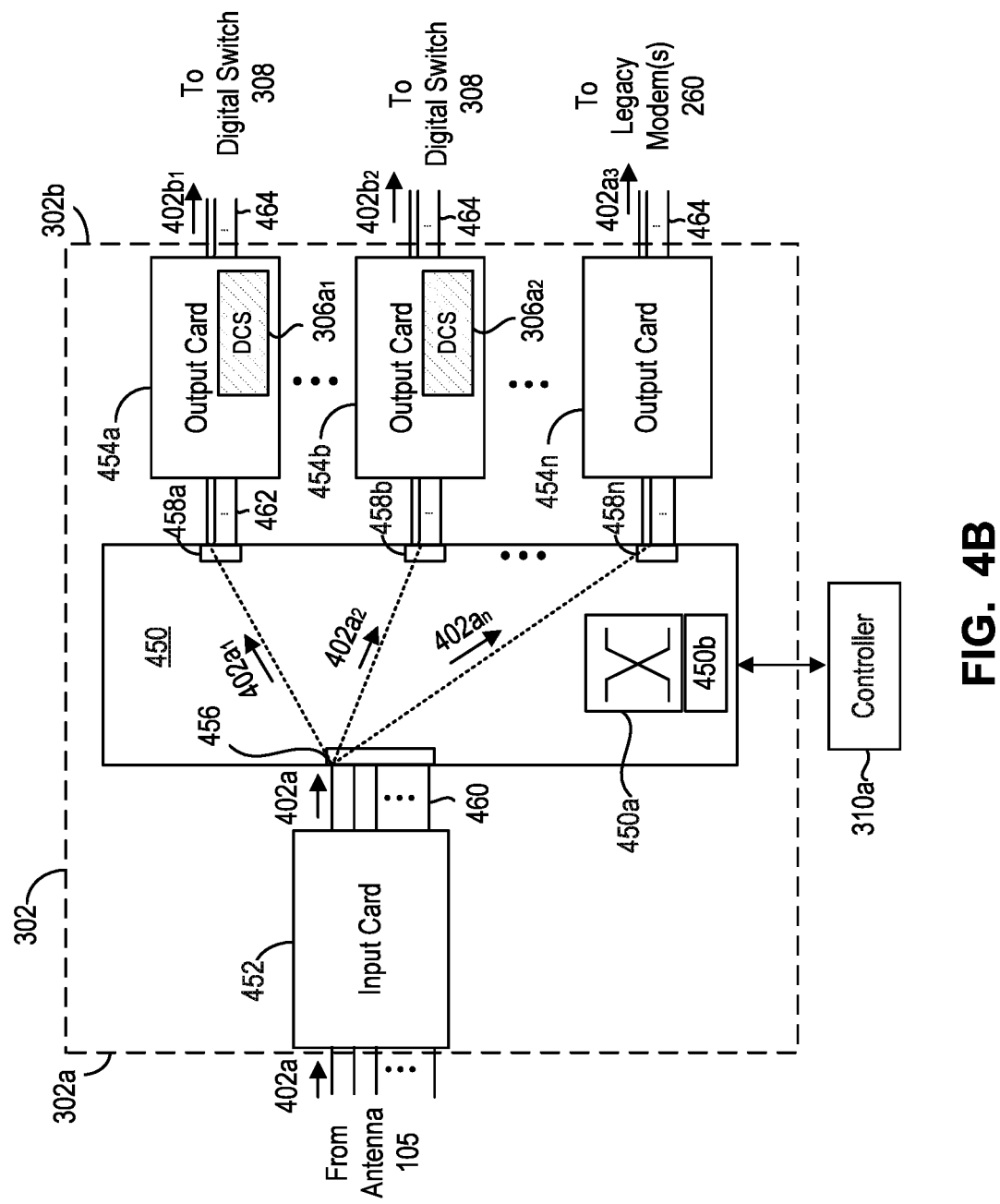
FIG. 4B is an example embodiment of an analog receiving router used in the system of FIG. 3A.

Reference is now made to FIG. 4B, which shows an example embodiment of the analog receiving router 302 used in the system 300*a* of FIG. 3A.

As shown, the receiving router 302 may include a cross-point switch 450, as well as one or more input cards 452 and output cards 454.

Cross-point switch 450 may include one or more inputs ports 456 (although only a single input port 456 is shown), and one or more output ports 458*a*-458*n*. The input port 456 is coupled to the input card 452, via connections 460, and receives analog signals therefrom. The output ports 458 are coupled to respective output cards 454*a*-454*n*, via connections 462, such that signals can be transmitted to the output cards 454.

To this end, cross-point switch 450 may have one of a number of architectures, i.e., one-stage, two-stage or CLOS architecture. An example of a CLOS architecture or two-stage is explained herein, in greater detail, with reference to FIGS. 6A-6B, 7A and 8A, and can be analogously applied in the switch 450 to provide routing and "fan-out" functionalities.

In more detail, input card 452 may receive the analog signal 402*a* (i.e., an IF signal 402*a*)—received from antenna 105—and the signal may be passed through the switch 450. In some cases, the input card 452 may perform some initial processing on the signal 402*a*, e.g., for impedance matching, amplification, attenuation, prior to passing the signal to switch 450. While only a single input card 452 has been illustrated for simplicity, it will be understood that more than one input card 452 may be provided. For example, different input cards 452 may be couplable to different input ports 456 of the switch 450.

Cross-point switch 450 includes a switch matrix 450*a*, for routing signals between the input connections 460 and the output connection 462. The configuration of the switch matrix 450*a* may be controlled by controller 310*a* (FIG. 4A).

In at least one embodiment, the cross-point switch 450 may act to "fan-out" the input signal 402*a*, and in turn, generate multiple copies 402$a_1$-402$a_n$ of that input signal. For example, the cross-point switch 450 may include signal processing hardware, i.e., signal splitter 450*b*, for splitting the signal into multiple copies. Each of the signals 402$a_1$-402$a_n$ may be routed to a separate output connection 462 to be received by a separate destination. In this manner, the router 302 may be considered to be a "fan-out" router. In some cases, the signal splitter 450*b* may be controllable by controller 310*a*.

As further shown, output cards 454*a*-454*n* are coupled to respective output ports 458*a*-458*n* to receive the routed signals 402*a*. In the illustrated embodiment, the output cards 454 include: (i) output cards 454*a*, 454*b* coupled to the digital switch 308 (or any other digital system, e.g., digital modems), as well as (ii) output cards 454*n* coupled to one or more analog modems 262 (or any other receivers of analog signals).

Output cards 454*a*, 454*b*—coupled to the digital switch 308—incorporate a digital conversion subsystem (DCS) 306$a_1$, 306$a_2$. FIG. 4E shows a simplified block diagram of an example DCS 306*a*. As shown, the DCS 306*a* may include one or more of an analog to digital convertors (ADC) 402*e*, a frequency tuner/selector 404*e*, a bandwidth selector 406*e* and a channel selector 408*e*.

ADC 402*e* converts analog signals, received by the output cards, into the digital domain so as to generate output digital signals 402*b*. In at least some embodiments, the analog signal 402*a* may include a plurality of frequency channels. That is, the analog signal 402*a* may be a wideband signal, spanning a large frequency range comprising multiple frequency channels. Accordingly, the DSC 306*a* may further include the frequency tuner/selector 404*e*, a bandwidth selector 406*e* and a channel selector 408*e*.

In more detail, the frequency selector 404*e* can be used to select the desired center frequency out of the wideband input signal 402*a*. Bandwidth selector 406*e* may then select the desired bandwidth around that center frequency. In some cases, bandwidth selector 406*e* can also provide a filtering function (i.e., low pass filtering) and a decimation function (i.e., rate reduction functions). Channel selector 408e may then select the desired channels out of the chosen bandwidth of information. In some cases, the DCS 306a can also incorporate functionality to generate any desired type of packetized or non-packetized digital signal, as desired.

In some cases, the frequency selector 404e may additionally incorporate frequency tuning (or shifting) functionalities, such as to become a frequency selector and tuner. The frequency tuning can shift the desired bandwidth center frequency range to a lower frequency range, that is processable by downstream digital devices (i.e., digital modems). In other cases, the frequency tuning may be provided as a separate functional block from the frequency selector 404e.

In at least some embodiments, the DCS 306a may be implemented as circuitry on an FPGA (Field Programmable Gate Array) board.

It will be appreciated that the placement of the ADC 402e in DCS 306a may also be re-arranged while providing the same overall output result. For example, rather than placing the ADC 402e at the start, the ADC 402e may also be placed between the frequency selector/tuner 404e and the bandwidth selector 406e. ADC 402e can also be placed between the bandwidth selector 406e and the channel selector 408e. Still further, ADC 402e can be placed after the channel selector 408e. In still other cases, the ADC 402e can be placed between a frequency selector and a frequency tuner, i.e., if these blocks are separately provided. Accordingly, the conversion between the analog and digital domains may occur at any point such that the operations at 404e, 406e and 408e may occur in either the digital or analog domains.

Here, it will become apparent that the DCS of FIG. 4B is distinguished from the DCS of FIG. 2B in that the DCS 306a not only performs analog to digital conversion, but is also enabled with functionalities of frequency selection, bandwidth selection and/or channel selection. Accordingly, the DCS 306a is an augmented version of the DCS 250. In some cases, the DCS 306a may be more broadly referred to as a "digitization system".

To this end, the DCS 306a could incorporate some of the functionality of the WSP 254 in the system 200b, which also performs some form of bandwidth and channel selection, and (but not necessarily) frequency tuning. An important appreciated advantage of this design is that the DCS 306a can therefore operates to narrow the bandwidth and data rate (e.g., 1-10 Gbps), of the output digital signal 402b (i.e., as a result of the frequency, bandwidth and channel selection), prior to passing the signal to digital switch 308. In turn, it is not necessary to provide a complex, high bandwidth, high throughput and costly digital switch 308 adapted for routing wide bandwidth digital signals (FIG. 2B). That is, the outport bandwidth requirements, on router 302, and the cost on the digital switch 308 can be significantly reduced. In turn, the system 300a may use a lower cost digital switch 308 for routing narrower bandwidth signals. Still further, as the DCS 306a can partially perform the function of the WSP 254, the WSP 254 hardware can be reduced or minimized.

A further appreciated advantage is also observed in the combination of the DCS 306a with the fan-out router design. More particularly, the fan-out property of switch 450 enables generating multiple copies of a single signal, all the while preserving the original signal copy. Each separate copy may be routed to a separate DCS 306a in the same, or a separate output card 454. Accordingly, each signal copy may be individually processed by a respective DCS 306a to allow separate frequency, bandwidth and channel selection. In this manner, a plurality of output signals—from the same or different output cards 454—are generated, wherein each signal may map to a different frequency, bandwidth or channel in the original signal received at the input card. Each of these signals is then independently routable to a different downstream digital system (i.e., digital switch 308 or directly to digital modems 258). As stated, each of these signals may be lower bandwidth and may be transmitted at a lower data rate, to allow for less complex digital switching and to reduce reliance on WSPs 254. To the extent WSPs 254 are incorporated into the system 300a, the channel pre-selection by the DCS 306a can still significantly reduce the WSP requirements.

It will be noted that this same functionality is not specifically offered in the system 200b. In the system 200b, the DCS 250 does not perform any of frequency selection or otherwise bandwidth or channel selection, and on separate copies of the input signal. Accordingly, the entire wide bandwidth signal, comprising all channels, is transmitted to the digital switch 252, and to each WSP 254 connected to each sub-grouping of digital and analog modems 258, 262. A plurality of WSPs 254 are then required to perform signal channelization, etc. The inclusion of many WSPs 254 (as well as LMDCs 260) can significantly increase the cost of system implementation. Additionally, to the extent the DCS 250 of system 200a is able to perform frequency tuning, it is only able to perform this one channel at a time. In at least some example cases, the DCS 306a may be coupled to the controller 310a (or any other controller). In this manner, the controller can dynamically vary the configuration parameters of the DCS 306a. For example, a controller can adjust the ADC functionality, frequency selection, frequency tuning, bandwidth selection and/or channel selection properties of the DCS 306a.

Referring back to FIG. 4B, in some embodiments—within each output card 454—there may be multiple DCSs associated with each output connection 464. Accordingly, each DCS can be separately configured to handle and process signals that are output at a given output connection 464. For example, each output connection 464 may be associated with a different channel, such that the DCS associated with each output connection may have a channel selector configured for selecting a different channel (i.e., each DCS 306a is a one channel DCS 306a). In some cases, the aggregate of multiple single DCSs 306a (i.e., on a single output card) may be referred to collectively as a multichannel DCS.

Figures 4C, 4D:
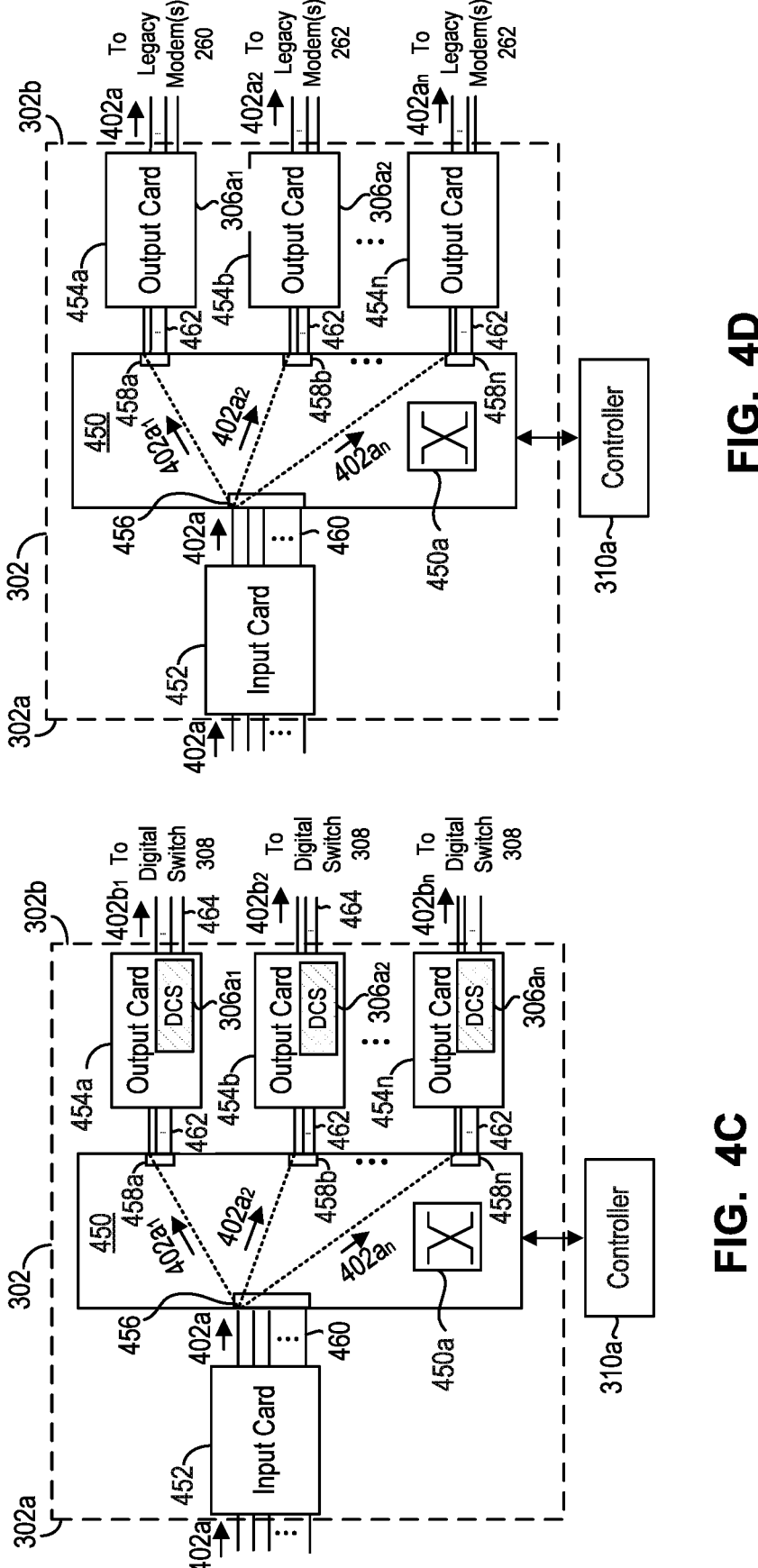
FIG. 4C is another example embodiment of an analog receiving router used in the system of FIG. 3A.
FIG. 4D is still another example embodiment of an analog receiving router used in the system of FIG. 3A.
Figure 4E:
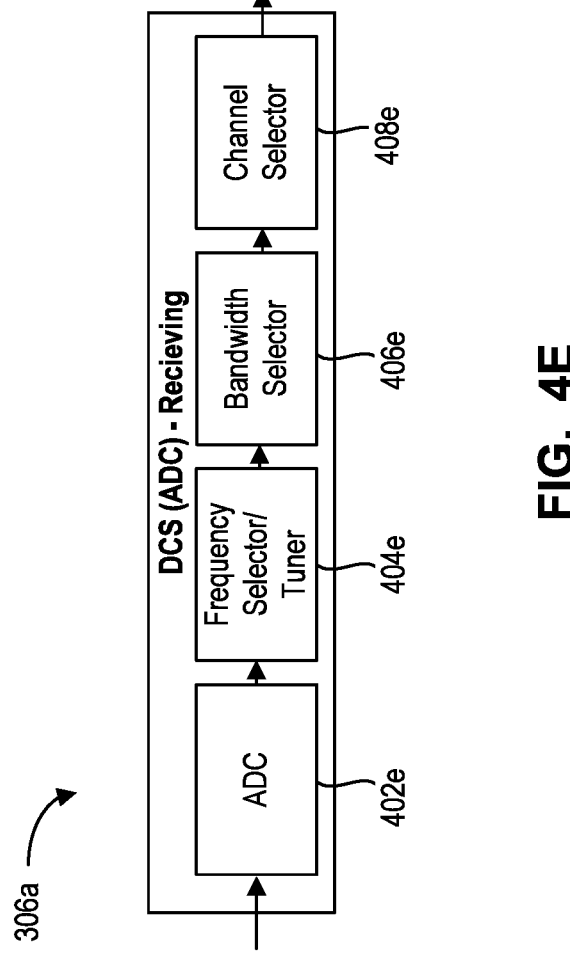
FIG. 4E is an example embodiment of a digital conversion subsystem (DCS), in accordance with some embodiments.

FIGS. 4C and 4D show example embodiments for alternate configurations for the receiving router 302. These configurations can be achieved by swapping-in or swapping-out removable output cards 454.

For example, in FIG. 4C, the output cards 454 all comprise augmented output cards with DCS functionality and which connect to the digital switch 308. For instance, it may be desirable to only route signals to digital modems 258, or otherwise the system 300a may only include digital modems 258—accordingly, only augmented output cards 454 may coupled to the switch output ports 458. In FIG. 4D, the output cards 454 are swapped for regular analog output cards 454, which couple to legacy modems 262.

Accordingly, another appreciated advantage of the system 300a is that the router 302 is flexibly, and dynamically adaptable to interface with as many digital or legacy modems, as desired.

Figure 5A:
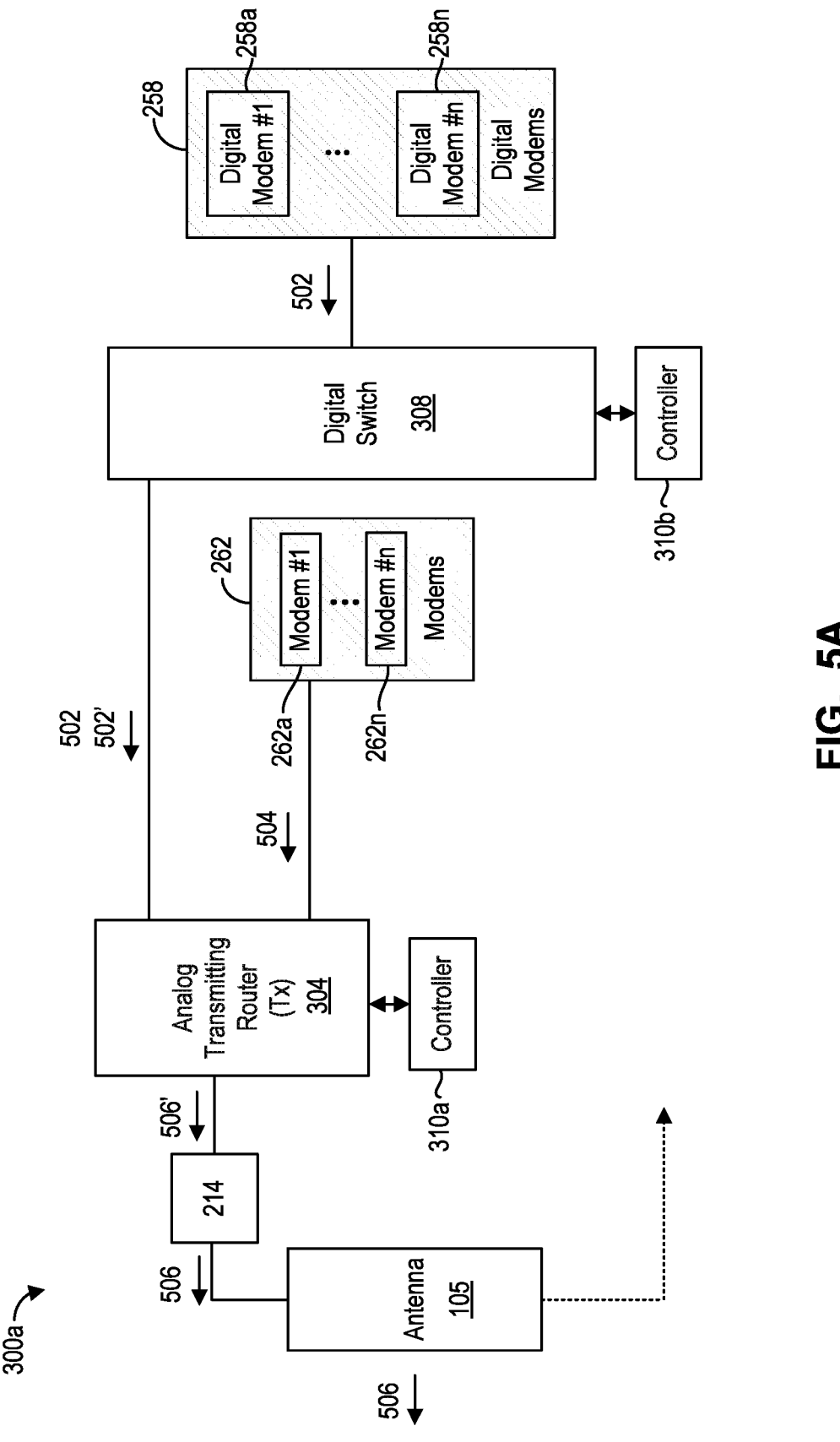
FIG. 5A is an example signal flow through the system of FIG. 3A, in an example case where a signal is transmitted for broadcast by an antenna.

Reference is now made to FIG. 5A, which illustrates a reverse signal flow through the system 300a in an example case where a signal is now being broadcast by the antenna 105.

As shown, signals may be generated by one or more digital modems 258 and legacy modems 262. Digital signals 502, generated by digital modems 258, are routed through the digital switch 308 to the transmitting router 304. In some cases, the digital switch 308 may generate and route a modified digital signal 502'. For example, the modified signal 502' can comprise a combination of multiple received digital signals 502, received from the same or a different digital modem 258. Similarly, analog signals 504 may also be received from one or more analog modems 262. These signals are also transmitted through the analog transmitting router 304.

Figure 5B:
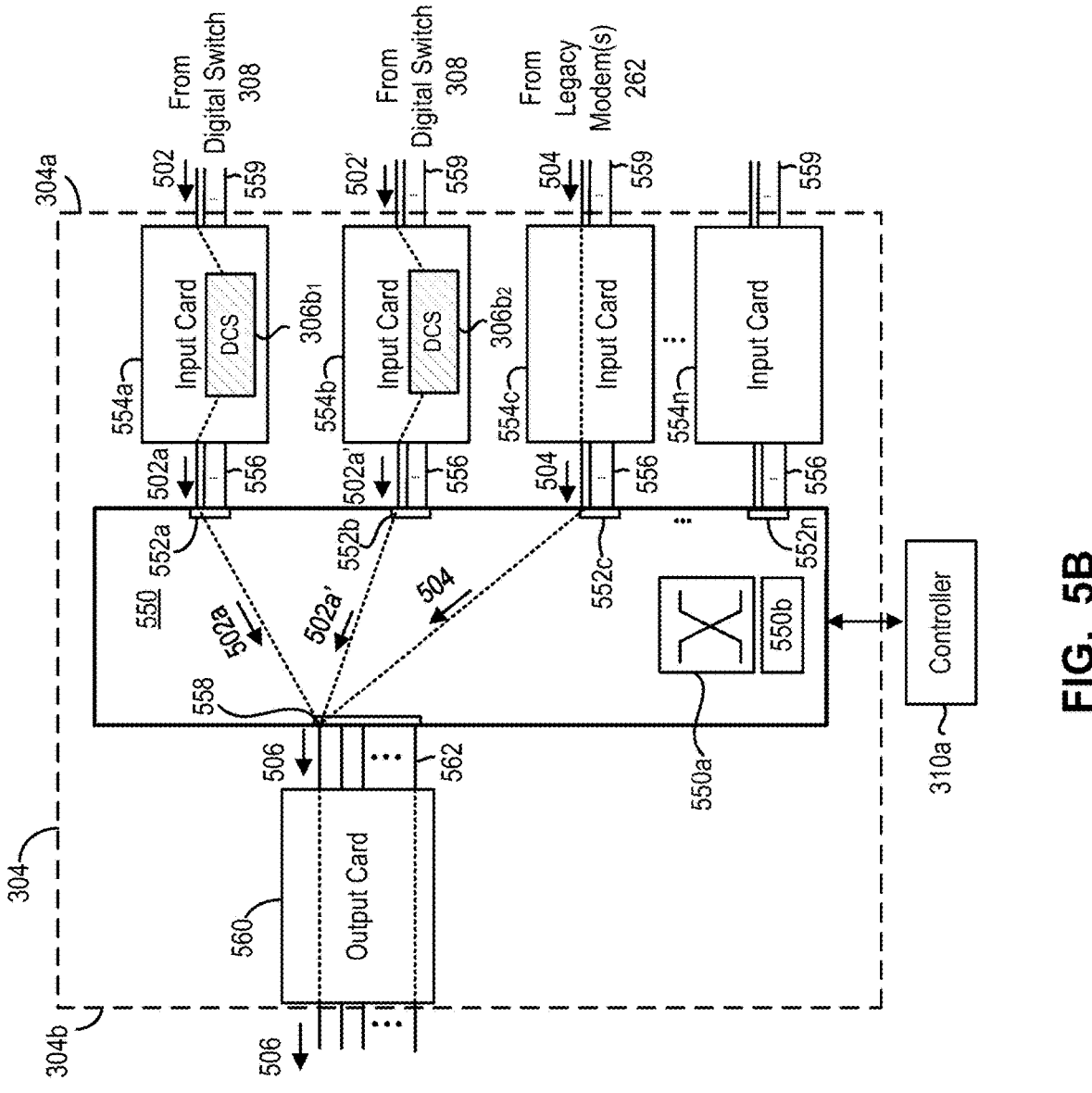
FIG. 5B is an example embodiment of an analog transmitting router used in the system of FIG. 3A.

Reference is now made to FIG. 5B, which shows an example embodiment of the transmitting router 304.

As shown, the router 304 includes a cross-point switch 550 which includes one or more input slots 552 and output slots 558. Input slots 552 may couple one or more input cards 554a-554n, via connections 556. Output slots 558 may couple to one or more output cards 560, via connections 562. Although only a single output card 560 is shown, it will be understood that any number of output cards 560 may be coupled to the cross-point switch 550. In at least one embodiment, input cards 554 and output cards 560 are removably connected to the cross-point switch 550.

Cross-point switch 550, itself, includes a switch matrix 550a. Switch matrix 550a routes input signals from input cards 554 to output card 560. For example, switch matrix 550a can route signals between an input connection 556 to an output connection 562. In at least one embodiment, the switch matrix 550a may have a variable routing configuration, which is controlled by controller 310a. For example, controller 310a can alter the switching configuration to route signals between different input connections 556 and output connections 562.

Cross-point switch 550 can also be configured to combine multiple signals such that the router 304 may act as a "fan-in" router. That is, switch 550 may receive, concurrently, multiple analog signals 502a, 502a', 504—and may combine these signals into a single signal 506. For example, cross-point switch 550 may comprise one or more signal combiners 550b, formed of passive signal combining circuitry. The signal combiner 550b may operate to multiplex multiple signals in the time and/or frequency and/or phase domains. In various cases, the signal combining 550b may also be controlled by the controller 310a.

To this end, similar to switch 450, cross-point switch 550 may have one of a number of architectures, i.e., one-stage, two-stage or CLOS architecture. An example of a CLOS or two-stage architecture is explained herein, in greater detail, with reference to FIGS. 6A-6B, 7A and 8A, and can be analogously applied in the switch 550 to provide similar fan-in routing functionalities.

Input cards 554 can include multiple types of input cards, including: (i) a first type of input card 554a, 554b which receives digital signals 502, 502' from the digital switch 308 (or any other digital systems, e.g., digital modems), and converts these signals into analog signals before passing the signals into the cross-point switch 550; and (ii) a second type of input card 554c which receives analog signals from legacy modems 262 (or any other sources of analog signals), and passes these signals directly to the cross-point switch 550.

With respect to the first type of input cards 554a, 554b— these input cards may be coupled to the digital switch 308 via one or more connections 559. Each of the input cards may include a DCS 306b, which transforms the received digital signal 502, 502' into a corresponding analog signal

502a, 502a'. These input cards may also be referred to herein as "augmented input cards", having the additional DCS functionality. Further, as provided herein, the DCS 306b (FIG. 5B) is to be differentiated from the DCS 306a (FIG. 4B), which performs the reverse analog to digital conversion. As used herein, the DCS 306a may be referred to herein as a type one DCS 306a, and the DCS 306b may be referred to herein as a type two DCS 306b.

Figures 5C, 5D:
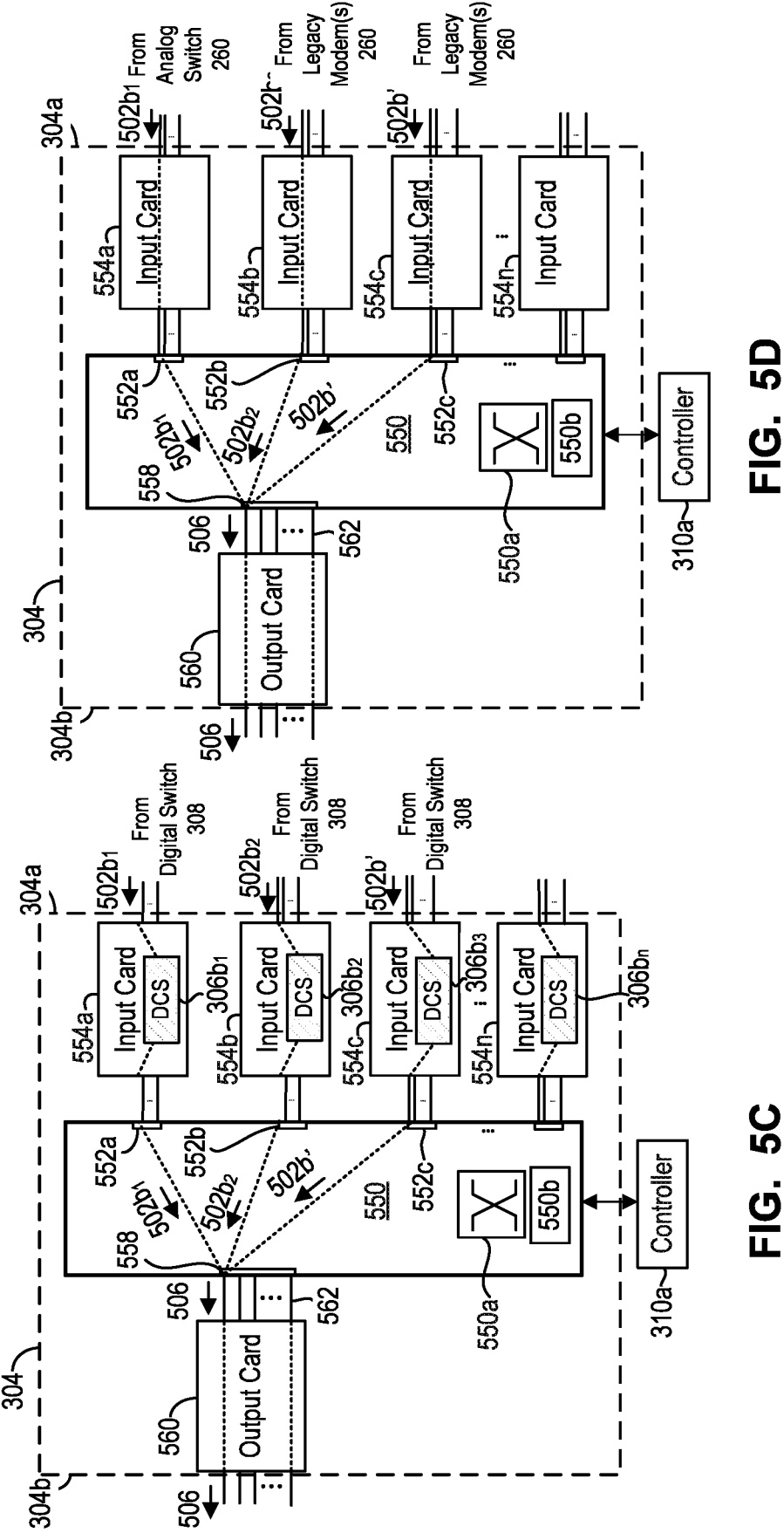
FIG. 5C is another example embodiment of an analog transmitting router used in the system of FIG. 3A.
FIG. 5D is still another example embodiment of an analog transmitting router used in the system of FIG. 3A.
Figure 5E:
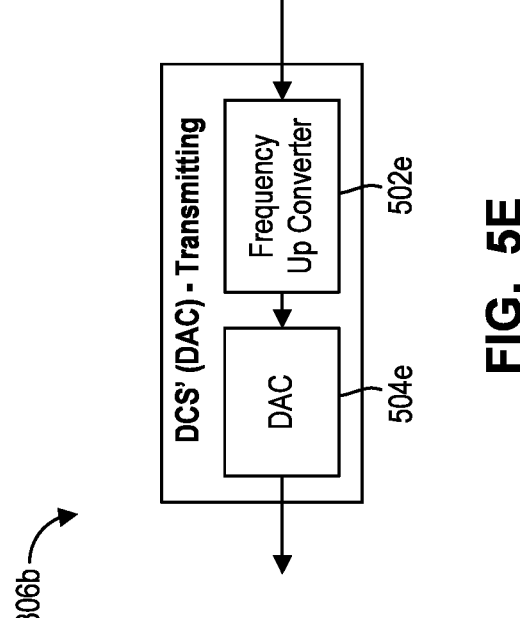
FIG. 5E is an example embodiment of a digital conversion subsystem (DCS), in accordance with some other embodiments.

To this end, reference is briefly made to FIG. 5E which shows a simplified block diagram of an example type two DCS 306b. As shown, the DCS 306b includes a frequency up converter 502e as well as a digital to analog converter 504e.

In operation, the frequency up converter 502e receives a digital signal 502b, 502b' and translates the signal from a processed frequency (e.g., zero IF) to the desired center frequency of operation within the non-zero Intermediate frequency (IF) range. The DAC 504e may then convert that signal into the analog domain, to generate a corresponding analog signal 502a, 502a', which is routable through the analog cross-point switch 550. The DCS 306b may also be operable to convert different standards and formats of digital signals into the analog domain.

In some cases, rather than using a frequency up converter 502e, the frequency can be shifted using a translating (i.e., heterodyning) digital converter. In other cases, the converter 502e may not be provided or may be otherwise in operational, i.e., where frequency shifting/translation is not required. In these cases, the signal is processed directly by the DAC 504e. In still other cases, the converter 502e may also be located after the DAC 504e, such that frequency translation is applied to the analog signal, rather than the digital signal.

Here, it will be appreciated that the combination of DCSs 306b with the fan-in routing topology offers unique benefits. For example, the multiplexing/aggregating of signals in router 304 can replace the need to perform this functionality using an external, high throughput, high bandwidth, expensive WSP 254. As well, using the disclosed architecture, signals from legacy analog modems 262 and digital modem 258 can be multiplexed in router 304 providing significant system simplification by eliminating WSPs 254, LMDCs 260 of system 200b.

In FIG. 5B, while only a single DCS 306b is shown per input card 554, there may be multiple DCS's located in the input card. For example, there may be a DCS 306b associated with each connection 556 or 559 leading into, or out of, the input card 554.

In at least one embodiment, the DCS 306b may be controllable, e.g., by controller 310a. For example, controller 310a may be operable to control the configuration parameters of the frequency up converter 502e and/or the DAC 504e. For example, this can occur to accommodate for different digital input signals 502 that may be received by the input card 554a, 554b.

With respect to the analog input card 554c, this card may receive analog signals 556 from the analog modems 262, and may simply pass these analog signals directly to the cross-point switch 550.

In some cases, each of the input cards 554 may also additionally perform some processing on the received input signals (i.e., for impedance matching, etc.).

FIGS. 5C and 5D show alternative configurations for the router 304 of FIG. 3A, where different input cards 554 are "swapped" in connection with the input ports 552. For example, FIG. 5C shows a configuration where all of the input cards 554 are augmented input cards with DCS 306b functionality. The configuration in FIG. 5C can be used, for example, where the system 300a only includes digital modems, or otherwise, only digital modems are broadcasting signals. FIG. 5D shows a configuration where all of the input cards 554 are analog input cards, which interface with legacy modems 262.

Figure 3B:
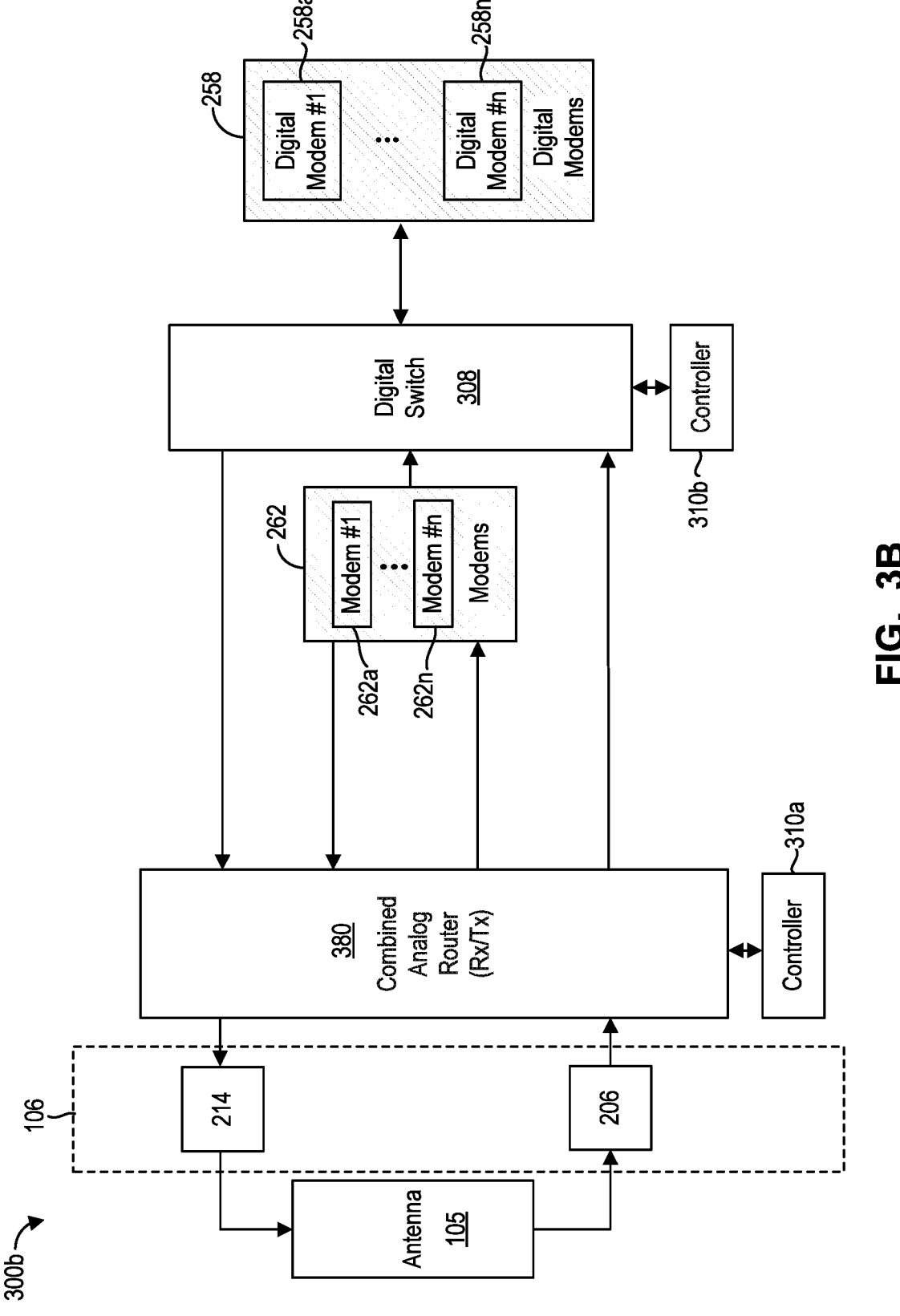
FIG. 3B is a simplified block diagram of an example hybrid analog and digital signal processing and routing system, according to another example embodiment.

Reference is now made to FIG. 3B, which shows a simplified block diagram of an alternative configuration for an example hybrid analog and digital signal processing and routing system 300b.

Routing system 300b is generally analogous to the routing system 300a, with the exception that a combined router 380 is provided for use in both the receiving and transmitting pathways, i.e., as contrasted to separate routers 302 and 304 in FIG. 3B.

Figure 6A:
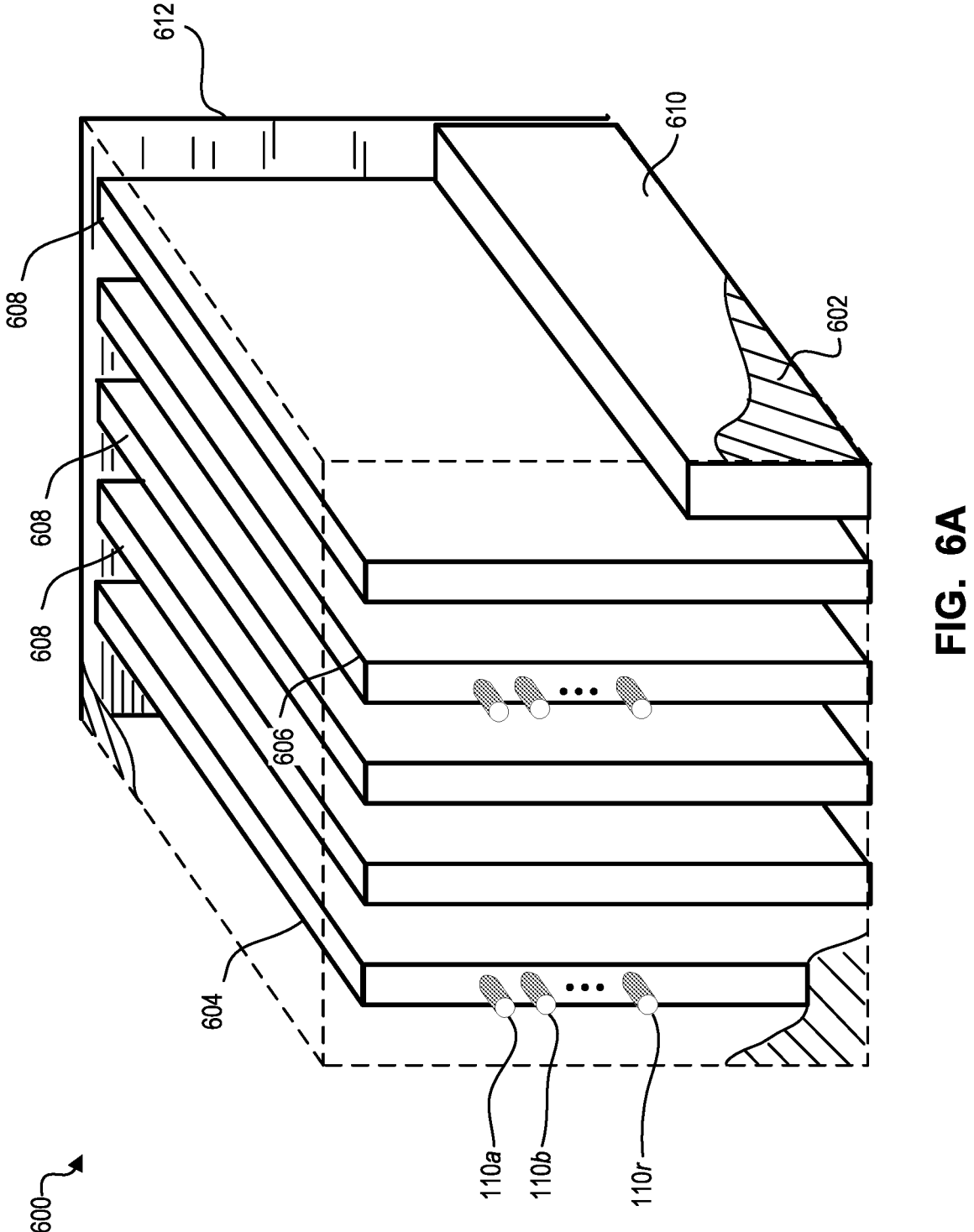
FIG. 6A is a schematic illustration of multiple cards connecting to a backplane in an example router.

FIG. 6A shows a schematic illustration of an example of a router 380. As shown, the router 380 may include a frame 602 for retaining one or more cards. For example, these may include one or more input cards 604, one or more output cards 606 and one or more switch cards 608. In some example cases, the frame 602 may also retain one or more controllers 610.

Figure 6B:
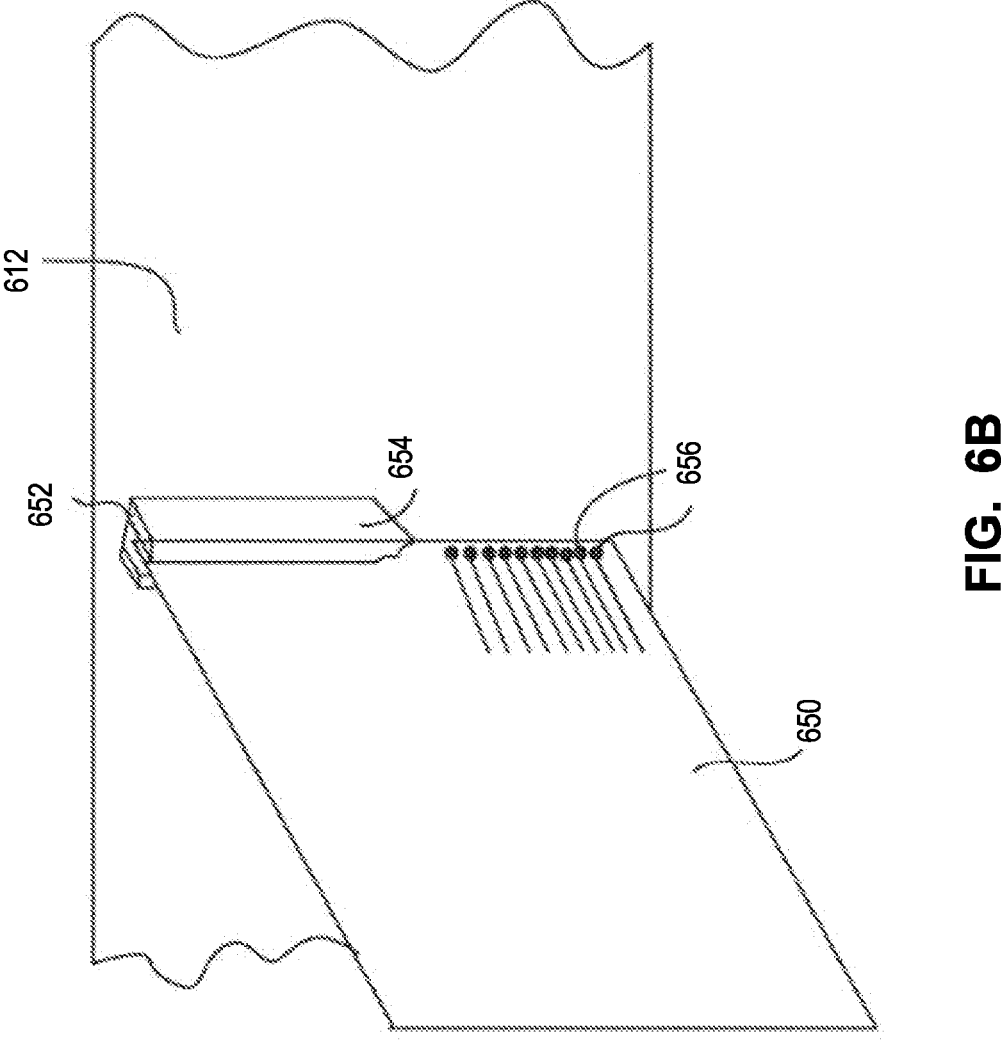
FIG. 6B is a schematic illustration of a card connecting to a backplane.

Each of the cards 604-608, as well as controller 610, may couple to a backplane 612. For instance, as shown in FIG. 6B, a card 650 (i.e., an input card, output card or switch card) may be removably insertable inside of the backplane connector 652, which includes a plurality of backplane pins or contacts 654. Each card 650 includes a plurality of card pins or contacts 656, each of which corresponds to a backplane pin 654 of the corresponding backplane connector. When a card 650 is installed in frame 602, the card pins 656 couple with corresponding backplane pins 652 making an electrical connection through which a data signal may be transmitted and/or received.

In at least some embodiments, the router configuration illustrated in FIGS. 6A and 6B can also be adopted with respect to each of the routers 302 and 304 (FIG. 3A). For example, rather than using a cross-point switch 450 (FIG. 4B) or 550 (FIG. 5B), the routing may be performed using one or more switch cards, which are coupled to the input and output cards via a respective backplane.

Figure 7A:
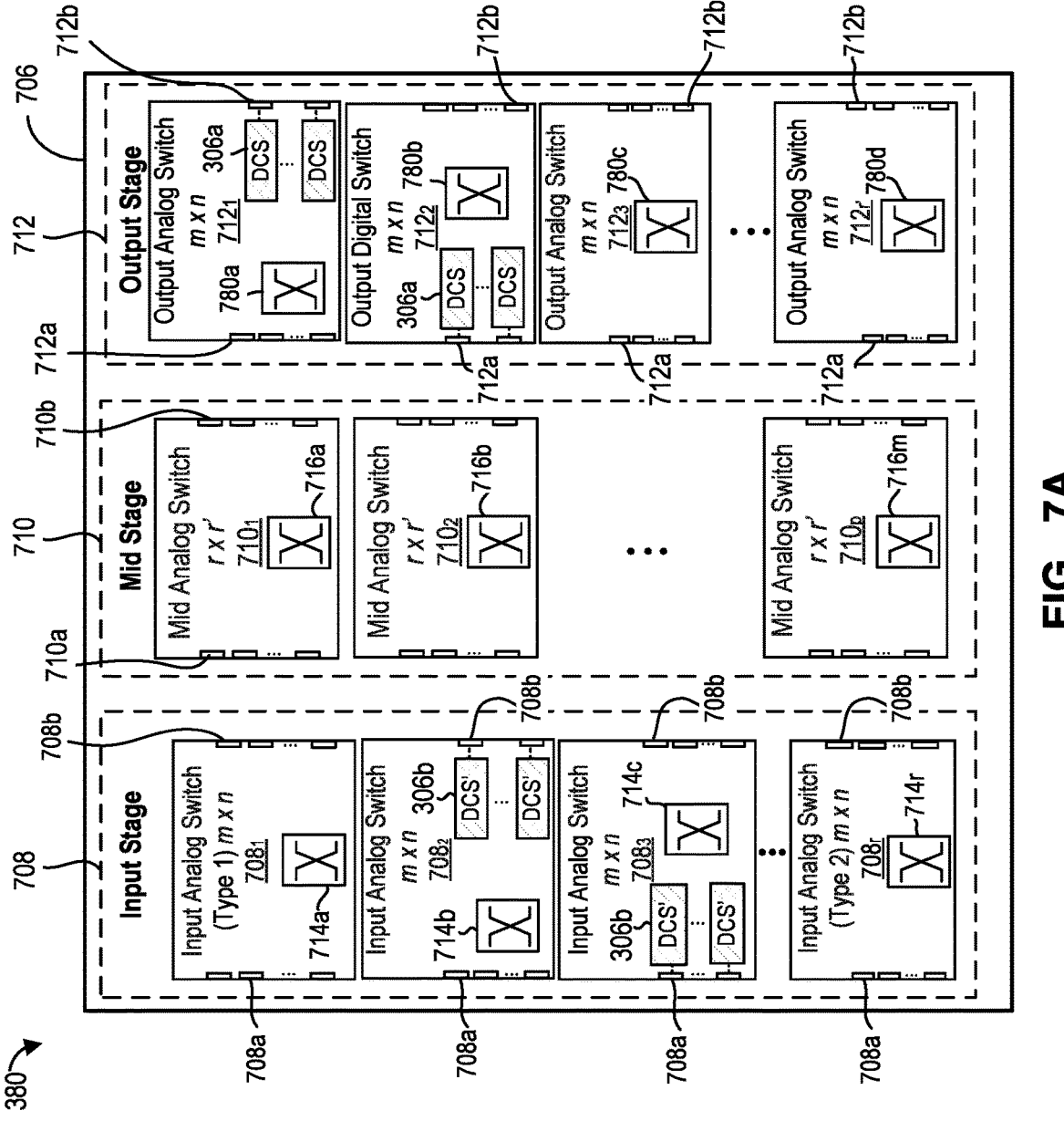
FIG. 7A is an example embodiment of a combined receiving and transmitting router that may be used in the system of FIG. 3B.

Reference is now made to FIG. 7A, which shows one example embodiment of the combined router 380 of FIG. 3B. As shown, the router 380 includes a three-stage CLOS routing core 706. The three-stage CLOS routing core 706 can include one or more input stage switch cards 708 (i.e., 708₁-708ᵣ), one or more mid stage switch cards 710 (i.e., 710₁-710ₘ), and one or more output stage switch cards 712 (i.e., 712₁-712ᵣ). Each of the input, mid and output stage cards may include one or more respective input ports 708a, 710a, 712a and output ports 708b, 710b, 712b. The mid stage switch cards 710 may connect to both the input stage cards 708 and output stage cards 712 via backplane connections to their output and input ports 708b, 712a, respectively.

Although not shown, each of the input, mid and output stage cards may be further connected to the controller 310a, which may control the routing configuration of each card. Further, while also not shown, router 380 may also include input and output cards, that are connected to the input stage and output stage switch cards, respectively, via the backplane.

As shown, the mid stage 710 can comprise a plurality of rxr' analog switch cards 710 for routing analog signals between the input and output stages 708, 712. Input stage 708 and output stage 712 can include various types of input and output switch cards for routing analog signals, which are discussed in greater detail herein.

Figure 7B:
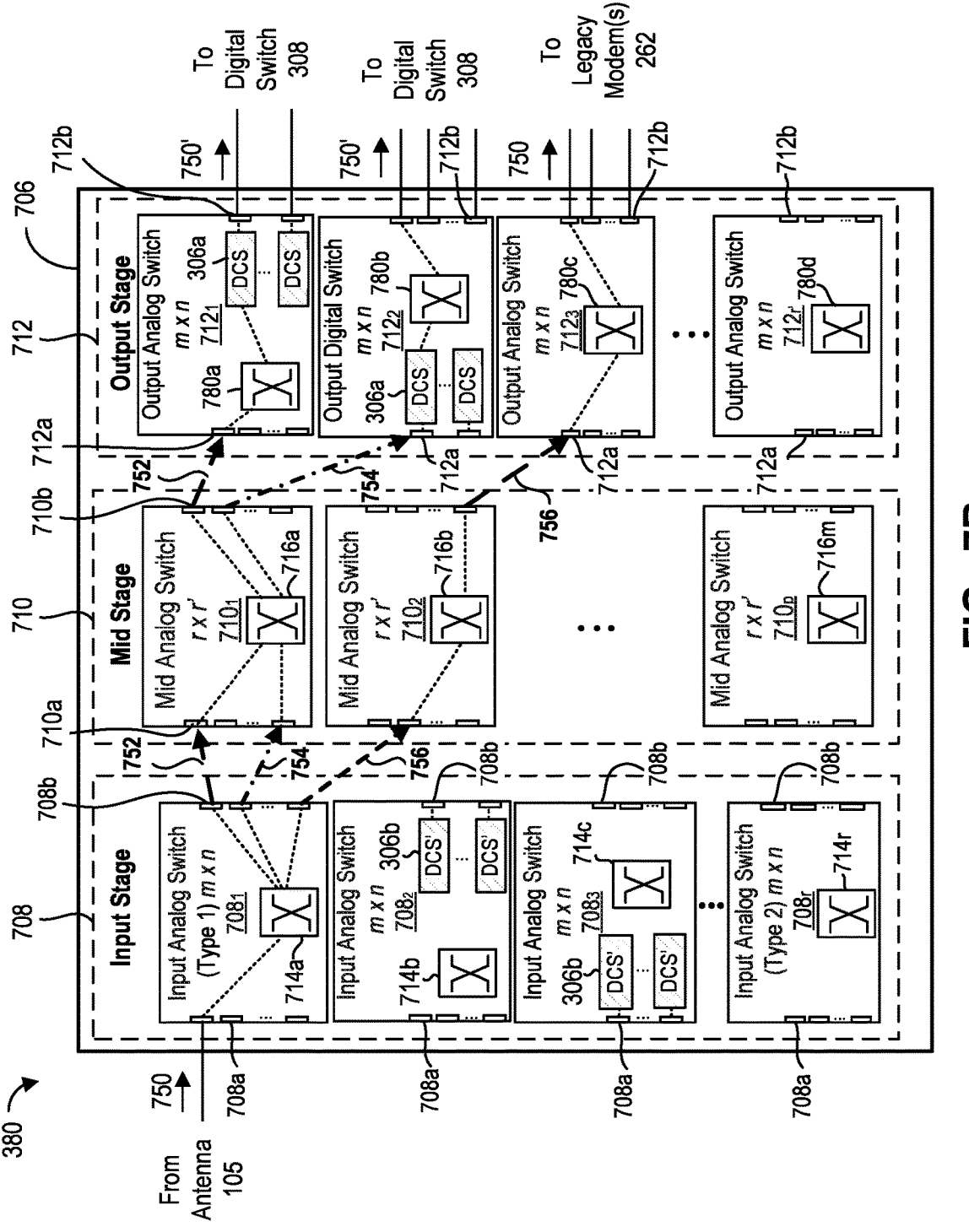
FIG. 7B shows an example receiving pathway through the router of FIG. 7A.

FIG. 7B shows example signal paths along the receiving pathway, i.e., when signals are received from the antenna 105.

As shown, an analog signal 750 may be received from the antennae 105, i.e., via the processing modules 206. For example, the received signal may be an IF analog signal. The signal is passed into an input stage switch card 708. In some cases, the signal may be passed to more than one input stage switch card 708.

At the input stage 708, the signal is received by an input analog switch 708a, and routed to one or more mid stage cards 710₁, 710₂. The mid stage switch cards 710 may then route the analog signal to one or more output stage switch cards 712.

Output stage 712 can include multiple types of output switch cards, based on the desired destination of the signal 750. For example, the output stage 712 can include output switch cards 712₁, 712₂ which enable routing of signals to the digital switch 308. Output stage 308 may also include output switch card 712₃, which allows routing of analog signals to legacy modems 262.

Output switch cards 712₁, 712₂—which route to the digital switch 308—may include both: (i) analog-based switch cards 712₁, and (ii) digital-based switch cards 712₂.

Analog switch cards 712₁ can include an analog switch matrix 780a that routes analog signals from mid stage 710. The analog signals are then processed by a DCS 306a (FIG. 4E), which generates a digital signal 750'. Digital signal 750' is routed through the output card 704 to the digital switch 308.

In contrast, digital-based switch cards 712₂ perform the reverse operation by initially processing the received analog signal using the DCS 306a to generate a digital signal. The digital signal is then routed through a digital switch 780b, and the digital signal 750' is output to the digital switch 308.

Output stage 712 can also include an analog switch card 712₃ which interfaces with the legacy modems 262. As shown, this switch card receives the analog signal from the mid stage 710, and routes the signal via an analog switch matrix 780c to the respective output card 712₃. The analog signal may then be passed to one or more of the legacy modems 262.

While FIG. 7B only shows one example of each output switch card 712₁, 712ₑ, 712₃—it will be appreciated that any number, of each type of switch card may be provided. For example, where it is desired to route more signals towards legacy modems 262, then more of the output switch cards 712₃ may be swapped into the router. Alternatively, if it is desired to route more signals towards the digital modems 258, then more of the output switch cards 712₁, 712₂ may be swapped into the router. This, in turn, underscores the flexibility and the adaptability of the router 306 to accommodate for different configurations of the system 300a.

It will also be appreciated from FIG. 7B, that the signal 750 may follow one of several paths to reach the output stage switch cards 712. For example, the signal 750 may follow a first path 752 or second path 754 through a first mid-stage switch card 710₁ to arrive at either the output stage card 712₁ or 712₂. Similarly, the signal 750 may follow a path 756, through a second mid stage card 710₂ to arrive at the output stage switch card 712₃. Accordingly, the signal may follow one of a number of routing paths, as between the input, mid and output stages.

While not illustrated, at least some of the input, mid stage and output stage cards may include signal processing modules. For example, these can include signal splitters that allow generating multiple copies of the received signal 750, such as to "fan out" and distribute the signal to more downstream devices.

Figure 7C:
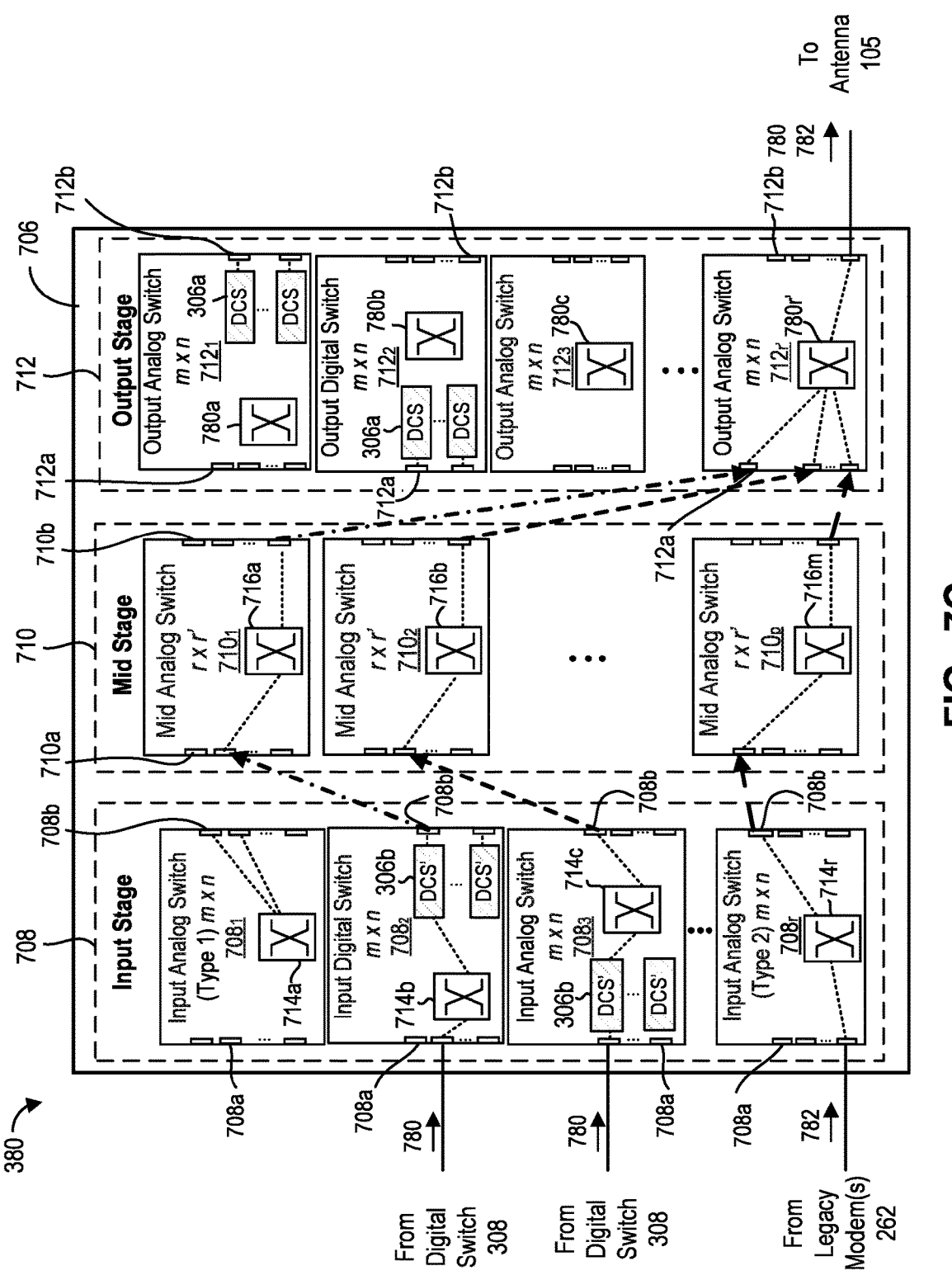
FIG. 7C shows an example transmitting pathway through the router of FIG. 7A.

Referring now to FIG. 7C, which shows example signal paths along the transmission pathway, or otherwise, when signals are sent for broadcast by antenna 105.

As shown, various types of input switch cards $708_2$, $708_3$, $708_r$ may be provided for receiving signals from the digital switch 308 and/or legacy modems 262. For example, for receiving signals from the digital switch 308—the router can include input digital switch card $708_2$ and an analog switch card $708_3$. Further, for receiving signals from legacy analog modems—the router can include input analog switch card $708_r$.

To this end, input digital switch card $708_2$ can include a digital switch matrix 714b and one or more DCS's 306b (FIG. 5E). As shown, a digital signal 780 is received, via input port 708a, and routed through the digital matrix 714b towards an output port 708b. However, prior to exiting the output port 708b, the DCS' 306b may convert the digital signal into an analog signal, among other functions explained with respect to FIG. 5E.

Input analog switch card $708_3$ may also receive digital signals 780 at input ports 708a—and may convert the digital signals into analog signals via the DCS' 306b. The analog signals 306b are routed through the analog switch matrix 714c toward an output port 708b. The input analog switch $708_3$ may also be referred to herein as an "augmented" analog input switch, owing to the DCS' functionality.

Conversely, input analog switch $708_r$ may include input ports 708a, which receive analog signals 782 from the legacy modems 262. The analog signals 782 are then routed through the analog switch matrix 714 to one or more output ports 708b.

As shown, mid stage switch cards 710 route signals from the input switch cards 708, to one or more output analog switch cards $712_r$. Output switch card $712_r$, in turn, connects to the antenna 105, i.e., via transmitting processing modules 214.

It will be understood herein, that while router 380 has been referenced as a "combined router", the router 380 may have separate functionalities as only a receiving "fan-out" router (302 in FIG. 3A), or a transmitting "fan-in" router (304 in FIG. 3B), depending on which signals are received and which input and output switch cards 708, 712 are connected to the mid stage 710. To this end, an identical router design can be used, separately, to implement the cross-point switch 450 in router 302, and/or switch 550 in router 304. For example, two separate routers, having the architecture in FIG. 7A, may be provided for each of router 302 and 304, and enabled with fan-in or fan-out functionality by using different input and output switch cards 708, 712, and routing, splitting and/or combined configurations.

Figure 8A:
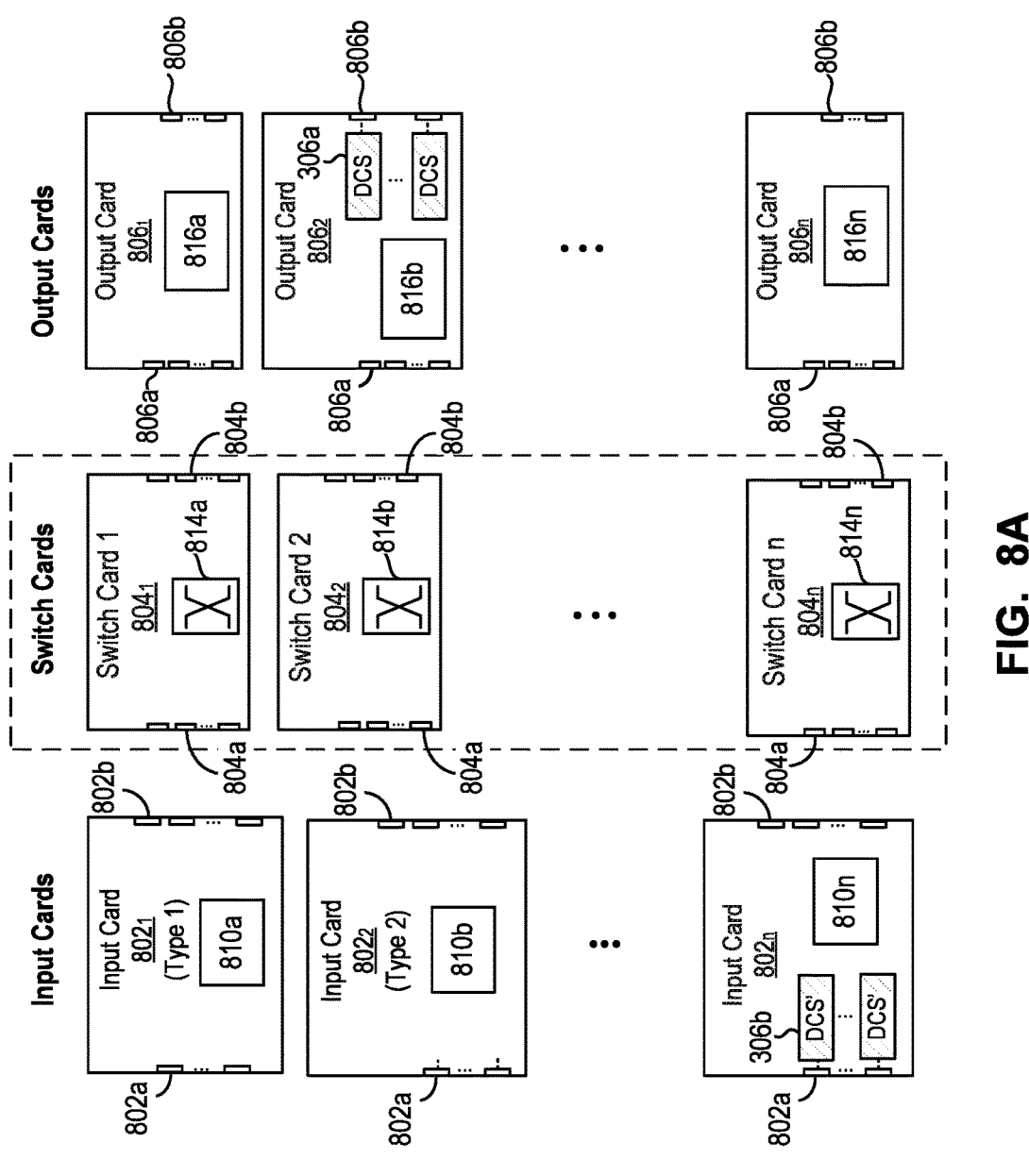
FIG. 8A is another example embodiment of a combined receiving and transmitting router that may be used in the system of FIG. 3B.

Reference is now made to FIG. 8A, which shows another example embodiment of the combined router 380 of FIG. 3B. The router configuration in FIG. 8A may be referred to herein interchangeably as a two stage router architecture, dual stage architecture or otherwise a non-CLOS single stage architecture.

As shown, router 380 may include one or more input cards $802_1$-$802_n$, one or more switch cards $804_1$-$804_n$ and one or more output cards $806_1$-$806_n$. Each of the input, switch and output cards may include respective input ports 802a, 804a, 806a and respective output ports 802b, 804b and 806b. The output ports 802b, of the input cards 802, may couple to the input ports 804a of the switch cards 804, via a backplane connection. Further, the output ports 804b, of the output cards 804, may couple to the input ports 806a of the output cards 806, also via backplane connections.

Figure 8B:
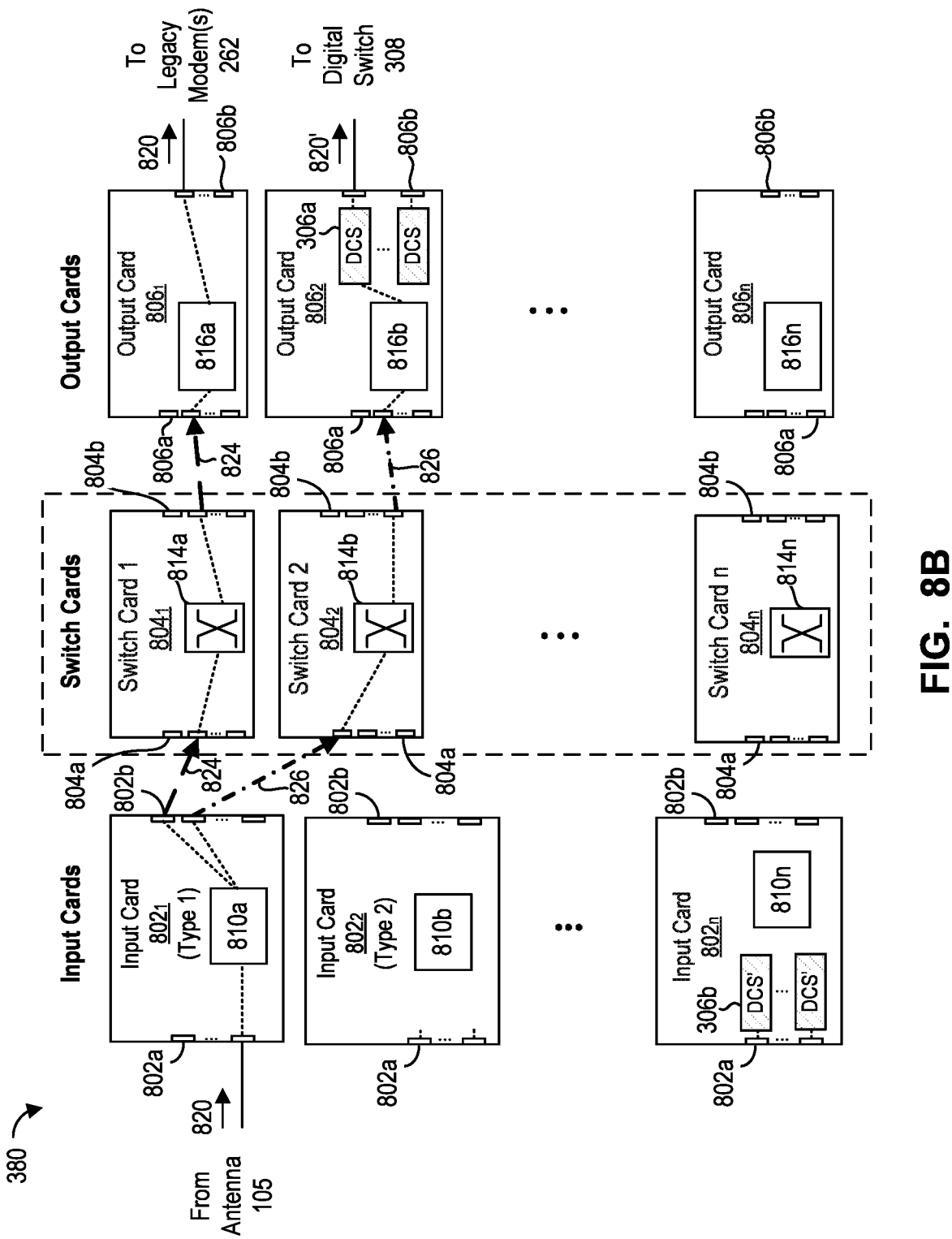
FIG. 8B shows an example receiving pathway through the router of FIG. 8A.
Figure 8C:
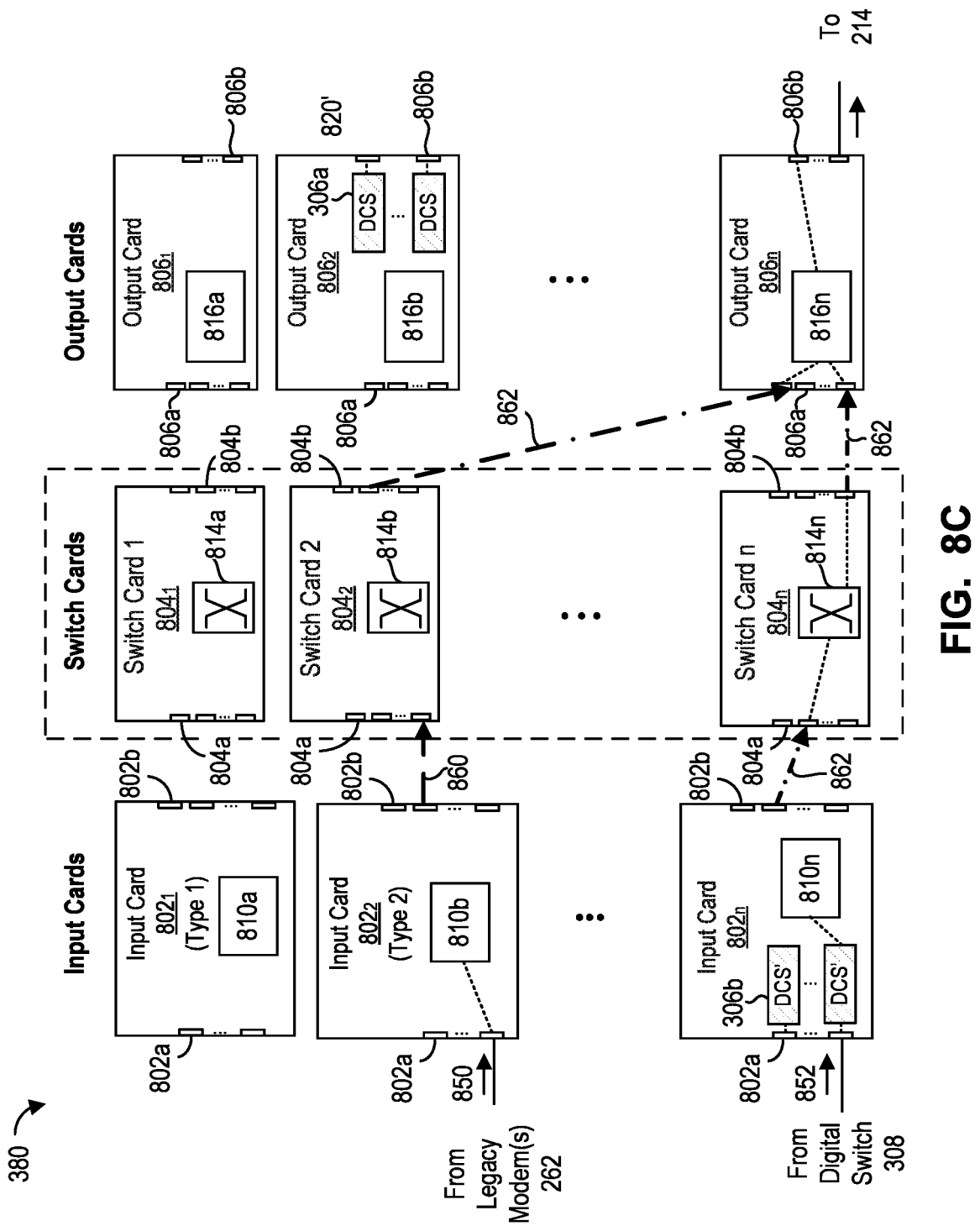
FIG. 8C shows an example transmitting pathway through the router of FIG. 8A.

FIG. 8B shows example signal paths through the router 308 in the receiving pathway. Further, FIG. 8C shows example signal paths through the router 308 in the transmission pathway.

Referring first to FIG. 8B, which shows an example receiving pathway through router 308—the input cards 802 may include a first type of input card $802_1$, which is coupled to receive analog signals 820 from antenna 105, i.e., via processing modules 206 (FIG. 3B).

Input card $802_1$ may receive the analog signal 820 at an input port 802a, and pass the signal to one or more output ports 802b. In some cases, the input card $802_1$ may include signal processors 810a which can perform, for example, signal splitting to generate multiple copies of the signal 820. In this manner, copies of the signal 820 can be transmitted to multiple output ports 802b of the input card 802. This may allow, for example, routing multiple copies of the signal to different end destinations.

The analog signals 820 are then received at the input ports 804a, of one or more switch cards 804, and routed via each card's switch matrices 814a-814n to a respective output port 804b.

Output cards 806 can include two types of output cards. A first type of output card $806_1$ may couple to legacy modems 262. This output card can receive the analog signal at its input port 806a, and pass the signal to a designated output port 806b, to continue forward to modems 262. In some cases, the output card $806_1$ can also include signal processor 816a which may, for example, combine or further split received signals.

A second type of output card $806_2$ may couple signals to the digital switch 308. As shown, this output card may include one or more DCSs 306a (FIG. 4E) which, among other functions previously described, converts the analog signal into a digital signal 820'. The digital signal may then be transmitted to the digital switch 308. Output card $806_2$ may also include a signal processor 816b for performing signal combining, splitting, impedance matching, etc.

As further shown, signals may take multiple paths 824, 826 between the input card, one of several switch cards, and the output card 806.

Referring now to FIG. 8C, which shows an example transmitting pathway through router 380 of FIG. 8A. To accommodate for signal transmission, router 380 may further include additional input card types $802_2$ and $802_n$.

Input card $802_2$ may include input ports 802a which couple to one or more legacy modems 262, to receive analog signals 850 therefrom. Input card $802_2$ may be referred to herein as a type two input card, which is distinguished from the type one input card $802_1$ which receives analog signals from the antenna 105.

Input card $802_n$ may include input ports 802a, which are coupled to receive digital signals 852 from the digital switch 308. The input card $802_n$ may include a DCS' 306b (FIG. 5E) which, among other previously described functions, converts the digital signal into an analog signal.

Each of the input cards $802_2$, $802_n$ may also include signal processors 810b, 810n which can perform, for example, signal splitting, signal combining, or other types of processing (i.e., impedance matching, amplification, attenuation, etc).

Signals received at each input card $802_2$, $802_n$ are then output, via respective output ports 802b, to the switch cards 804. Switch cards 804 may route the signals to the output card 806$_n$. As shown, the signals may follow various signal paths 860, 862 to arrive at the output card 806$_n$.

Output card 806$_n$ receives various signals, and passes the signal to one or more output ports 806*b* which are coupled to the antenna 105, i.e., via the processing module 214. Output card 806$_n$ may again include a signal processor 816*n* for performing, for example, signal splitting, signal combining, or other types of processing (i.e., impedance matching).

Here, it will also be appreciated that the router configuration shown in FIG. 8A (i.e., using switch cards 804), can also be used to implement separate fan-in and fan-out routers. That is, by adjusting the configuration of input, output and switch cards, the architecture of FIG. 8A can be replicated to separately implement the receiving analog switch 450 (FIG. 4B), as well as the transmitting analog switch 550 (FIG. 5B), and using different switching card configurations.

Figure 9A:
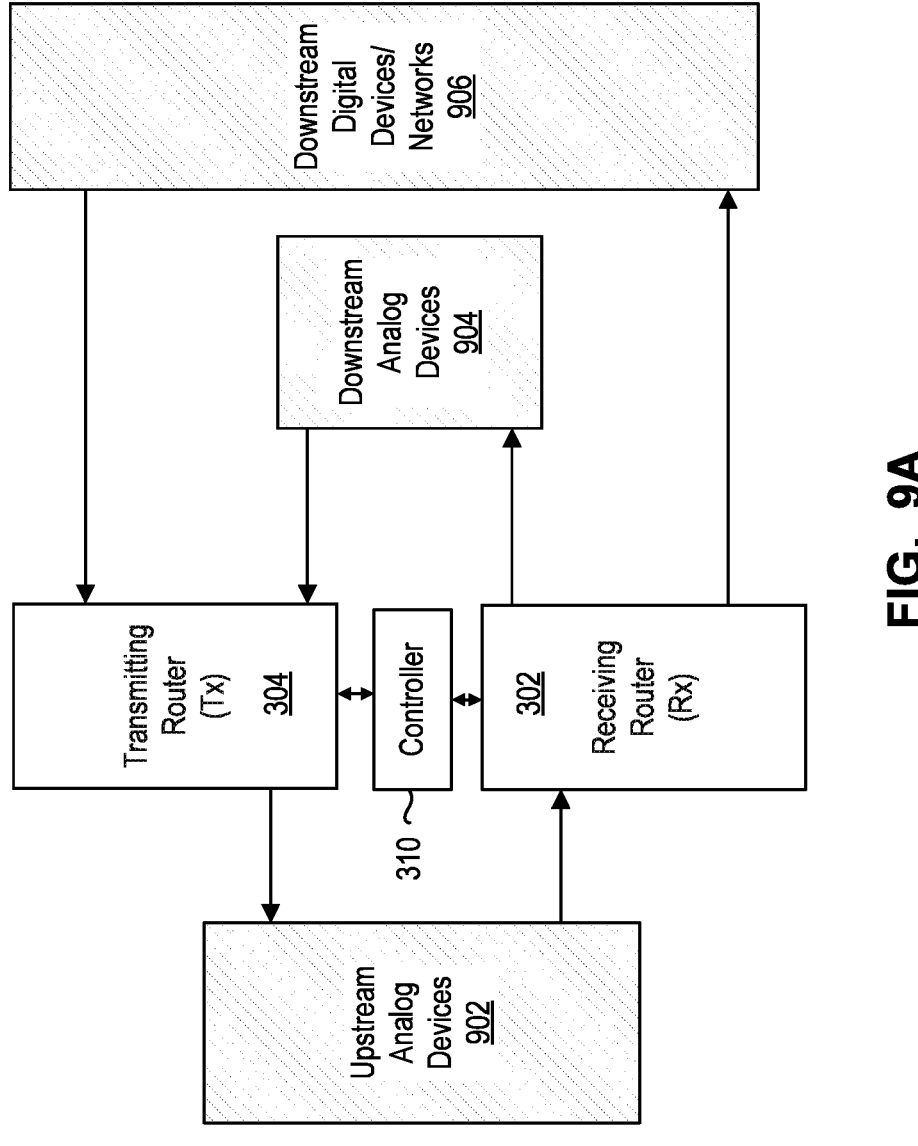
FIG. 9A is an example embodiment of a hybrid analog and digital routing system.
Figure 9B:
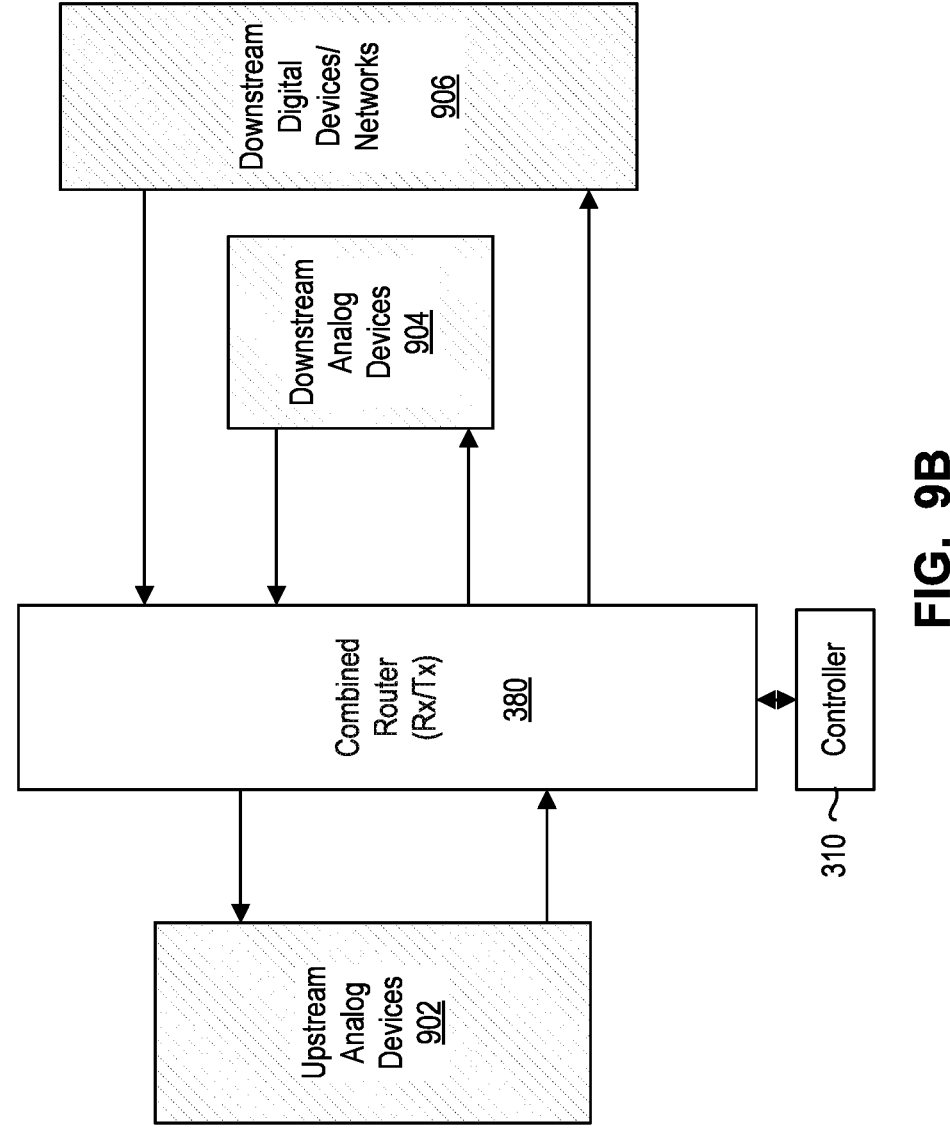
FIG. 9B is another example embodiment of a hybrid analog and digital routing system.

Reference is now made to FIGS. 9A and 9B, which illustrate a simplified block diagram of a more generalized application for the routers described herein. In particular, while the routers 302, 304 (FIG. 3A) and 308 (FIG. 3B) have been described in an antenna-based communication system application, it will be appreciated that the same hybrid router design configuration can be applied, more broadly, to any system comprising upstream and downstream analog and digital devices, systems and networks.

For example, as shown in the system 900*a* of FIG. 9A, the receiving and transmitting routers 302, 304, may be connected to various upstream analog devices 902, as well as various downstream analog and digital devices and networks 904, 906. Routers 302, 302 may route signals between 902-906, as previously described with respect to FIGS. 4A-5E.

Similarly, as shown in the system 900*b* of FIG. 9B, a combined router 380 can be used in a more generalized application, to route signals between 902-906 as previously described with respect to FIGS. 7A-8C.

While the above description provides examples of the embodiments, it will be appreciated that some features and/or functions of the described embodiments are susceptible to modification without departing from the spirit and principles of operation of the described embodiments. Accordingly, what has been described above has been intended to be illustrative of the invention and non-limiting and it will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

The invention claimed is:

1. A system for signal routing, the system comprising:
a receiving router having:
an upstream signal input side for receiving one or more incoming analog signals at one or more analog input connections;
a downstream signal output side for transmitting outgoing signals corresponding to the incoming analog signals at a plurality of output connections including one or more analog output connections and one or more digital output connections, the outgoing signals including:
one or more outgoing downstream analog signals, each outgoing downstream analog signal corresponding to at least a portion of at least one of the incoming analog signals; and
one or more outgoing downstream digital signals, each outgoing downstream digital signal corresponding to at least a portion of at least one of the incoming analog signals;
an analog signal cross-point switch having:
one or more input ports coupled to the upstream signal input side; and
one or more output ports, each output port coupled to one of the output connections;
one or more digital output cards, each digital output card including a digital conversion subsystem, coupled between at least one of the output ports and at least one of the digital output connections to convert at least one of the incoming analog signals routed by the analog signal cross-point switch to a digital domain and generate the one or more outgoing downstream digital signals,
one or more analog output cards coupled between at least one of the output ports and at least one of the analog output connections for transmitting the outgoing downstream analog signals; and
a controller coupled to the receiving router to control routing of signals between the analog input connections and the output connections, the controller configured to configure the cross-point switch to couple:
at least one of the incoming analog signals to an analog output connection; and
at least one of the incoming analog signals to the digital conversion subsystem.

2. The system of claim 1 wherein the digital conversion subsystem is adapted to select one or more channels from one or more of the incoming analog signals, and wherein the corresponding outgoing downstream digital signal corresponds to the selected one or more channels.

3. The system of claim 1 wherein the digital conversion subsystem includes:
a frequency selector for selecting a center frequency corresponding to a frequency channel; and
a bandwidth selector for selecting a frequency band corresponding to a bandwidth of the frequency channel.

4. The system of claim 1 wherein the digital conversion subsystem includes:
a channel selector for selecting a desired channel from a frequency band.

5. The system of claim 1 wherein the digital conversion subsystem includes:
a frequency tuner for shifting the center frequency of a frequency band to a lower frequency range suitable for processing by downstream digital devices.

6. The system of claim 1 wherein the digital conversion subsystem includes:
an analog to digital converter (ADC) for converting the incoming analog signals to generate corresponding outgoing downstream digital signals.

7. The system of claim 1 wherein the analog signal cross-point switch is configured with a fan-out configuration to provide copies of a particular incoming analog signal at a plurality of output ports, wherein copies of the particular incoming analog signal are routed to different output cards including at least one analog output card and at least one digital output card.

8. The system of claim 1 wherein the analog signal cross-point switch is configured with a fan-out configuration to provide multiple copies of a particular incoming analog signal at one of the output ports, wherein multiple copies of the particular incoming analog signal are routed to an output card having at least two digital conversion systems.

9. A system for signal routing, the system comprising:
a transmitting router having:
   a downstream signal input side for receiving one or more incoming signals at a plurality of input connections including one or more analog input connections and one or more digital input connections, the incoming signals including:
   one or more incoming downstream analog signals;
   one or more incoming downstream digital signals;
   an upstream signal output side for transmitting one or more outgoing analog signals at one or more analog output connections, wherein each outgoing analog signal corresponds to at least one of: the incoming downstream analog signals and the incoming downstream digital signals;
   an analog signal cross-point switch routing the one or more outgoing analog signals having:
      one or more input ports, each input port coupled to one of the input connections; and
      one or more output ports, each output port coupled to one of the analog output connections;
   one or more digital input cards, each digital input card including a digital conversion subsystem coupled between at least one of the digital input connections and corresponding input ports to convert the incoming downstream digital signals to the one or more outgoing analog signals routed by the analog signal cross-point switch, one or more analog input cards coupled between at least one of the analog input connections and corresponding input ports for receiving the incoming downstream analog signals; and
   a controller coupled to the transmitting router to control routing of signals between the input connections and the analog output connections, the controller configured to configure the cross-point switch to couple:
      at least one of the incoming downstream analog signals to one of the analog output connections; and
      at least one of the digital conversion subsystems to one of the analog output connections.

10. The system of claim 9 wherein the digital conversion subsystem includes a frequency up converter and wherein the digital conversion subsystem converts up converted incoming downstream digital signals to the one or more outgoing analog signals.

11. The system of claim 9 wherein the digital conversion subsystem includes:
   a digital to analog converter (DAC) for converting the incoming downstream digital signals to generate corresponding analog output signals.

12. The system of claim 9 wherein the analog signal cross-point switch is configured with a fan-in configuration to couple a plurality of input ports to one output port, wherein incoming signals from a plurality of input cards are routed to a particular output connection.

* * * * *